United States Patent
King et al.

(10) Patent No.: US 9,325,596 B2
(45) Date of Patent: Apr. 26, 2016

(54) ADAPTIVE SIGNALING FOR NETWORK PERFORMANCE MEASUREMENT, ACCESS, AND CONTROL

(71) Applicant: VoAPPs, Inc., Atlanta, GA (US)

(72) Inventors: David Alan King, Duluth, GA (US); Jonathan Edward Augenstine, Pasadena, CA (US)

(73) Assignee: VoAPPs, Inc., Atlanta, GA (US)

( * ) Notice: Subject to any disclaimer, the term of this patent is extended or adjusted under 35 U.S.C. 154(b) by 0 days.

(21) Appl. No.: 14/607,748

(22) Filed: Jan. 28, 2015

(65) Prior Publication Data

US 2015/0146541 A1    May 28, 2015

Related U.S. Application Data

(63) Continuation of application No. 13/437,910, filed on Apr. 2, 2012, now Pat. No. 8,976,676.

(60) Provisional application No. 61/470,693, filed on Apr. 1, 2011.

(51) Int. Cl.
*H04L 12/26* (2006.01)
*H04W 24/10* (2009.01)
*H04W 24/08* (2009.01)

(52) U.S. Cl.
CPC ............ *H04L 43/0876* (2013.01); *H04L 43/04* (2013.01); *H04W 24/10* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 5,063,523 A * | 11/1991 | Vrenjak | 709/223 |
| 6,215,774 B1 * | 4/2001 | Knauerhase et al. | 370/252 |
| 6,456,700 B1 | 9/2002 | Malik | |
| 6,526,044 B1 * | 2/2003 | Cookmeyer et al. | 370/352 |
| 6,651,099 B1 * | 11/2003 | Dietz et al. | 709/224 |
| 6,882,648 B2 * | 4/2005 | Kobayashi | 370/395.1 |
| 7,082,463 B1 * | 7/2006 | Bradley et al. | 709/223 |
| 7,260,060 B1 * | 8/2007 | Abaye et al. | 370/230 |
| 7,609,820 B2 | 10/2009 | Bedingfield, Sr. | |
| 8,069,143 B2 | 11/2011 | Swanburg et al. | |
| 8,150,003 B1 | 4/2012 | Coughlan et al. | |
| 8,204,500 B2 | 6/2012 | Weintraub et al. | |
| 8,451,990 B2 | 5/2013 | Albert et al. | |
| 8,565,732 B2 | 10/2013 | Zubas et al. | |
| 8,605,869 B1 | 12/2013 | Mobarak et al. | |
| 8,611,506 B2 | 12/2013 | Miller | |
| 8,976,676 B2 | 3/2015 | King et al. | |
| 2004/0034492 A1 * | 2/2004 | Conway | 702/81 |
| 2004/0073655 A1 * | 4/2004 | Kan et al. | 709/224 |
| 2005/0047389 A1 * | 3/2005 | Bond et al. | 370/351 |

(Continued)

*Primary Examiner* — Hassan Kizou
*Assistant Examiner* — Tejis Daya
(74) *Attorney, Agent, or Firm* — Ballard Spahr, LLP

(57) ABSTRACT

Systems and methods are provided for initiation, use, access, and control of functionality of a network. In one aspect, the systems and methods can be utilized to generate information defining signaling or control performance and operational characteristics associated with the functionality in a variety of network environments. In another aspect, based on such information, adaptive signaling can be utilized to monitor, analyze and detect specific signaling signatures associated with the functionality. Managing signaling or control messages in response to information collected by monitoring and analyzing the adaptive signaling permits originating or requesting the functionality without conventional operation of a network component.

20 Claims, 10 Drawing Sheets

(56) References Cited

U.S. PATENT DOCUMENTS

| | | | |
|---|---|---|---|
| 2006/0123133 A1* | 6/2006 | Hrastar | 709/238 |
| 2007/0160001 A1* | 7/2007 | Lovegren et al. | 370/328 |
| 2007/0206620 A1* | 9/2007 | Cortes et al. | 370/412 |
| 2008/0056159 A1* | 3/2008 | Suzuki et al. | 370/254 |
| 2008/0077358 A1* | 3/2008 | Marvasti | 702/187 |
| 2008/0126470 A1* | 5/2008 | Kadner et al. | 709/201 |
| 2009/0094361 A1* | 4/2009 | Srinivasan | 709/224 |
| 2009/0147698 A1* | 6/2009 | Potvin | 370/254 |
| 2010/0070574 A1* | 3/2010 | Li | 709/203 |
| 2010/0296402 A1* | 11/2010 | Fraccalvieri et al. | 370/252 |
| 2011/0143723 A1 | 6/2011 | Shaw et al. | |
| 2014/0009932 A1 | 1/2014 | Tarsa et al. | |

* cited by examiner

ADAPTIVE SIGNALING FOR NETWORK PERFORMANCE MEASUREMENT, ACCESS, AND CONTROL

CROSS-REFERENCE TO RELATED APPLICATION

This application is a continuation of U.S. Utility application Ser. No. 13/437,910, filed on Apr. 2, 2012, which in turn claims priority to Provisional Patent Application No. 61/470,693, filed on Apr. 1, 2011, all of which are incorporated herein by reference in their entireties.

SUMMARY

The disclosure relates, in one aspect, to accessing, using, and controlling attached functions, features, services and network infrastructure provided by such communication network elements on behalf of the party originating the communication session. One or more embodiments provide systems and methods that enable initiation, use, access and control to the attached functions, features, services and network infrastructure of a network is described. These methods and systems can be utilized to define signaling or control performance and operational characteristics in a variety of network environments. In addition or in the alternative, signaling signatures can be extracted from measurements of signaling information (e.g., timing metrics, type of messages, request processing time, etc.). The methods and systems described herein can utilize the signaling signatures in combination with adaptive signaling to monitor, analyze and detect the signaling signatures of networks and their network elements. Implementation of adaptive signaling can apply intelligence regarding the signaling or control message types, the timing of signaling or control messages, the timing between two or more signaling or control messages, the duration of and the sequence of signaling or control messages flowing in a network to produce a desired outcome. By managing signaling or control messages as described herein, the methods and systems permit originating or requesting attached function (a user, device, application, and on forth) to measure the performance of a signaling network or to access, use, or control other attached functions, features, services and network infrastructure in new and different ways.

In one aspect, the subject disclosure comprises a method for establishing the signaling or control message parameters of a network, a network element or of a signaling or control network associated with a network by which measuring the performance of a signaling network or obtaining access to, or the use or control of, attached functions, features, services or network infrastructure associated with a network is achieved via one or more network signaling events (NSEs).

In another aspect, the method can comprise establishing NSEs to determine the signaling or control performance and operational characteristics of a network, a network element or of a signaling or control network associated with the network.

In another aspect, the method can comprise establishing signaling or control timing requirements, metrics and performance baselines, such as the request processing duration of signaling or control messages, replies and other responses; the network transit time of signaling or control messages, replies and other responses; the timing between signaling or control messages, replies and other responses; the minimum timing of signaling or control messages, replies and other responses; the minimum timing between signaling or control messages, replies and other responses; the maximum timing of signaling or control messages, replies and other responses; and/or the maximum timing between signaling or control messages, replies and other responses.

In another aspect, the method can comprise establishing the operational characteristics of the signaling or control messages, requests and responses of a network, a network element or of a signaling or control network associated with the network including the types and the sequence of such messages, including the presence or absence of signaling or control messages, requests and responses.

In another aspect, the method can comprise identifying or developing NSE patterns intended to measure the performance of a signaling network or to access, use, or control, the desired attached functions, features, services or network infrastructure associated with a network. Such patterns being derived from the current and historical performance and operational characteristics, or other network status, data or descriptive information regarding the network, network element or the signaling or control network associated with the network.

In another aspect, the method can comprise developing the sequence and timing of NSE patterns to be initiated or utilized to measure the performance of a signaling network or to access, use or control, the desired attached functions, features, services or network infrastructure associated with a network.

In another aspect, the disclosure can include a method comprising measuring the performance of accessing, using or controlling, attached functions, features, services or network infrastructure associated with a network by initiating network signaling events (NSEs) in a network or network element and managing NSEs, NSE patterns, signaling or control messages or the flow of signaling or control messages associated with the initiation, operation or utilization of network signaling events. The method can comprise one or more of: (A) measuring and analyzing signaling or control message performance; (B) initiating and managing one or more NSEs or NSE patterns; (C) monitoring the signaling or control messages, the flow of signaling or control messages and other information related to such messages, flows and events such monitoring can include monitoring request processing duration of signaling or control messages, replies and other responses; the network transit time of signaling or control messages, replies and other responses; the timing between signaling or control messages, replies and other responses; the minimum timing of signaling or control messages, replies and other responses; the minimum timing between signaling or control messages, replies and other responses; the maximum timing of signaling or control messages, replies and other responses; and/or the maximum timing between signaling or control messages, replies and other responses); (D) togging and analyzing signaling or control messages, the flow of signaling or control message and other information related to such messages, flows and events; (E) identifying any appropriate response(s), replies or NSE modifications to signaling or control messages, the flow of signaling or control message and other information related to such messages, flows and events; and (F) initiating, managing or modifying NSEs or NSE patterns to implement the appropriate response(s) replies or NSE modifications.

In another aspect, the method can comprise initiating network signaling events (NSEs) in a network or network element to measure the signaling or control performance and/or behavior of one or more of a network, a network element, or a signaling or control network associated with the network, or to measure the flow of signaling or control messages. Such measurements comprising one or more signaling or control timing metrics or performance metrics, such as the request processing duration; the network transit time of the elapsed time between; the minimum elapsed time of; the minimum elapsed time between; the maximum elapsed time of; and the maximum elapsed time between NSEs, NSE patterns, signaling or control messages, and any associated NSE or signaling or control message replies and responses. In addition or in the alternative, such metrics can comprise monitoring request processing duration of signaling or control messages, replies and other responses; the network transit time of signaling or control messages, replies and other responses; the timing between signaling or control messages, replies and other responses; the minimum timing of signaling or control messages, replies and other responses; the minimum timing between signaling or control messages, replies and other responses; the maximum timing of signaling or control messages, replies and other responses; and/or the maximum timing between signaling or control messages, replies and other responses.

In another aspect, the method can comprise logging and analyzing signaling or control timing metrics and/or performance metrics (such as conventional or customized key performance indicators (KPIs)) to determine the signaling or control performance of a network, a network element or of a signaling or control network associated with the network, or to determine any desirable NSEs or NSE patterns, responses, replies, modifications or other NSF actions desirable for accessing, using or controlling attached functions, features, services or network infrastructure associated with a network. For example, such logging and analysis can comprise generating and analyzing records of request processing, sequences of signaling events and responses including the presence or absence of NSEs or responses, the repetition of NSEs, the duration of signaling or control messages, replies and other responses; network transit time of signaling or control messages, replies and other responses; timing between signaling or control messages, replies and other responses; the minimum timing of signaling or control messages, replies and other responses; the minimum timing between signaling or control messages, replies and other responses; the maximum timing of signaling or control messages, replies and other responses; and/or the maximum timing between signaling or control messages, replies and other responses.

In another aspect, the method can comprise initiating and managing one or more NSEs or NSE patterns, responses, replies, modifications or other NSE actions desirable for accessing, using or controlling, attached functions, features, services or network infrastructure associated with a network.

In another aspect, in certain embodiments, the timing of NSE initiations (e.g., Inter-NSF timing), responses, replies and requests can be controlled in order to elicit the desired behavior from the signaling or control system, or from the attached functions, features, services or network infrastructure elements associated with a network.

In another aspect, the duration of NSEs may be controlled in order to elicit the desired behavior from signaling or control network elements, the attached functions, features, services or network infrastructure associated with a network.

In another aspect, the disclosed steps of monitoring, logging, analysis and response identification to NSEs, NSE patterns, signaling or control messages, the flow of signaling or control messages and other information related to such messages, flows and events can include information such as signaling and control message types; sequence (e.g., presence or absence of message(s), order of transmitted and/or received messages, or the like); timing requirements; timing metrics; performance (which can include timing performance); operational characteristics; or other descriptive information regarding a network, the network element or the signaling or a control network associated with the network. A group of signaling or control messages and related performance and timing information can be referred to as the signaling or control message flow.

In another aspect, certain disclosed methods (e.g., exemplary method 800) can comprise monitoring, logging, and analysis of, and any response identification to the signaling or control messages, the flow of signaling or control messages and other information related to such messages, flows and events which, in certain scenarios, can include signaling information, such as the signaling or control messages themselves, NSEs, NSE patterns, signaling or control message responses or replies, message type information and corresponding information such as timestamps, expiry and other timers and logic rules.

In another aspect, the various analyzing actions disclosed herein can include, in addition or as an alternative, analyzing other non-signaling information (Local Exchange Routing Guide (LERG) records, local number portability (LNP) database records and changes thereof, LNP dips, etc.) in addition to signaling or control events.

In another aspect, disclosed methods can comprise identifying NSEs or identifying modifications to NSEs or to NSE patterns can be based, in certain scenarios, at least on analysis which can include modifications such as the initiation of additional NSEs or the purging of existing NSEs, the modification of NSE patterns, NSE flow, or NSE signaling or control responses including NSE information, such as the type, sequence, and timing and/or duration of an NSE.

In one aspect, the subject disclosure provides an adaptive signaling (ASIG) system for managing and controlling one or more Network Signaling Events (NSEs) utilizing network signaling or control messages to access, use, or control attached functions, features, services or network infrastructure associated with a network or network element, the network including one or more attached functions, features, services or network infrastructure devices. The ASIG system comprising: (a) an adaptive signaling control (ASIG-C) subsystem for initiating, managing and operating one or more network signaling events utilizing network signaling or control messages; and (b) an adaptive signaling Monitoring (ASIG-MA) subsystem for monitoring, measuring performance, establishing operational characteristics, logging, analyzing and subsequently determining appropriate responses to signaling or control messages, the flow of signaling or control messages associated with providing access to, or the use or control of, attached functions, features, services or network infrastructure associated with a network or network element.

In another aspect, in one embodiment, the ASIG-C system also can comprise (1) a NSE generation function for initiating one or more network signaling events (NSEs) network signaling or control messages; and (2) a signaling network performance function for measuring network signaling or control performance, establishing performance metrics and identifying network or network element operational characteristics.

In another aspect, in the ASIG-C system, the NSE generation function can include a timing sub-function for measuring and controlling NSEs or triggering additional NSEs or signaling or control message actions at specified time points.

In another aspect, in the ASIG-C system, the timing sub-function can control the timing between NSE initiations (the inter-NSE timing).

In another aspect, in the ASIG-C system, the NSE generation function may establish or control the duration of NSEs.

In another aspect, in the ASIG-C system, the NSE generation function can generate multiple NSEs at specified times and with various durations based at least on information such as logic, models, and/or the status of other discrete or concurrent NSEs In another aspect, in the ASIG-C system, the NSE generation function can include a Signaling Signature sub-function for generating patterns of one or more NSEs with specified timing and durations based at least on information such as logic, models, and/or the current status of other discrete or concurrent NSEs.

In another aspect, in the ASIG-C system, the signaling signature sub-function can generate alternate Signaling Signature patterns comprising one or more NSEs with specified timing and durations based at least on information such as logic, models or the current status of other discrete or concurrent NSEs.

In another aspect, in the ASIG-C system, the Signaling Network Performance Function signaling or control performance metrics can include information comprising one or more of, for example, NSE or request processing duration; the network transit time of signaling or control messages, requests and responses; the timing between signaling or control messages, requests and responses; the minimum timing of signaling or control messages, requests and responses; the minimum timing between signaling or control messages, requests and responses; the maximum timing of signaling or control messages, requests and responses; and/or the maximum timing between signaling or control messages, requests and responses.

In another aspect, in the ASIG-C System, the Signaling Network Performance Function can include and can utilize other network status information, other data or descriptive information, in addition to the performance metrics described herein, such alternative information including timing based information and historical information.

In another aspect, in the ASIG-C system, the NSE Generation Function can establish or control modification and/or purging of NSEs based at least on information such as logic, models, and/or status of other discrete or concurrent NSEs In another aspect, in the ASIG-C System, the NSE Generation Function and the Signaling Network Performance Functions and their sub-functions are embodied in a plurality of network and computing devices, the ASIG-C System further comprising means for the plurality of devices to communicate.

In another aspect, in one embodiment, the ASIG-MA system referred to herein also can comprise: (a) a monitoring function for monitoring the network signaling or control messages and signaling or control message flows; and (b) an analysis function for logging (e.g., generating and/or updating records) and performing analysis on the signaling or control messages, the signaling or control messages flows, the signaling or control message logs and any signaling or control network generated responses and other information in order to identify responses to any signaling or control messages, flows or events determined to require a response.

In another aspect, in the ASIG-MA system, the monitoring function can monitor signaling or control messages and signaling or control message flows for the types, content, sequence, or timing of signaling or control messages; signaling or control message flows; responses or replies to generation and/or utilization of NSEs, the responses or replies received from the network, signaling or control network associated with the network, and/or one or more of the network elements.

In another aspect, in the ASIG-MA system, the analysis function further comprises the step of logging signaling or control messages, the flow of signaling or control messages and other information related to such messages, flows and events which may include the signaling or control messages themselves, signaling or control message responses or replies, message type information, message content information, and corresponding information such as timestamps, expiry and other timers.

In another aspect, in the ASIG-MA system, the analysis function can perform analysis on signaling or control messages, the flow of signaling or control messages and other information related to such messages, flows and events which may include: the signaling or control messages themselves; signaling or control message responses or replies; signaling or control message type information; message content information; corresponding signaling or control message information such as hop counts, counters, origin and destination information, timestamps, expiry and other timers; signaling or control message sequence, timing, performance, operational characteristics, logic rules or other descriptive information regarding the network, the network element or the signaling or control network associated with the network of signaling or control messages.

In another aspect, in the ASIG-MA system, the analysis function can identify any necessary signaling or control responses, including the modification of NSE signaling or control responses, NSE signaling or control messages, NSE patterns, NSE flow events, NSE timing, the sequence of NSE messages, or other changes in operation deemed desirable as a system response.

In another aspect, in the ASIG-MA system, the identified response may include initiation of additional NSEs or the purging of existing NSEs.

In yet another aspect, in the ASIG-MA system, the monitoring function and the analysis functions and their sub-functions are embodied in a plurality of network and computing devices, the ASIG-MA system further comprising means for the plurality of devices to communicate.

One embodiment of the subject disclosure includes methods and related systems for accessing, using, or controlling, attached functions, features, services or network infrastructure associated with a network through the management of signaling or control protocols associated with the network. Access to, or the use or control of, these attached functions, features, services or network infrastructure elements is initiated by the attached function originating the session. The embodiment operates on the session that is being established, monitored, controlled or otherwise operated on while the remainder of the network is not affected.

The embodiment takes advantage of the manner in which network signaling or control protocols are deployed by the various network elements that comprise a network. While international standards typically define network signaling or control protocols, many aspects of these protocols are designated as optional or left to the network equipment manufacturer to deploy as deemed appropriate. Furthermore, in general, the methods and practices used by software developers to codify signaling or control protocol standards into actual software executing within a network element typically are empirical rather than based on first principles. This gives rise to certain patterns (referred to herein as operational characteristics) that can be detected in the operation of network signaling or control protocols. In other words, one manufacturer can implement a protocol one way, whereas another manufacturer can implement the same protocol in a slightly different way. Both are within the protocol standards, but the way they were enabled in the software varies. Such variations can be detected and made useful by an embodiment of the subject disclosure.

Typical protocol tools, systems and technologies focus on the actual contents of network signaling or control packets and their packet header information. Some embodiments of the disclosure differ from conventional solutions in that such embodiments can derive one or more patterns of signaling, or "signaling signatures," from variations in protocol implementations or operational characteristics described above. Such signaling signatures can be based at least on message types, sequencing, and/or the timing of and between of signaling or control messages in a network or network elements.

An exemplary system of the subject disclosure is referred to as adaptive signaling (ASIG) System (see, e.g., FIG. 4). The ASIG system can initiate, monitor, manage, analyze, and operate one or more network signaling events (NSEs) by utilizing, at least in part, network signaling or control messages. In one embodiment, the ASIG system can comprise two subsystems, one for initiating and managing NSEs and the other for monitoring and analyzing signaling or control messages. At least one or each subsystem can have functions and sub-functions designed to carry out specific tasks and functions which are described in greater detail herein.

In one aspect, a method is provided that comprises establishing the signaling or control message parameters of a network, a network element or of a signaling or control network associated with a network. The steps can comprise: (1) establishing NSEs to determine signaling or control performance and operational characteristics; (2) establishing signaling or control timing requirements, metrics and performance baselines; (3) establishing the operational characteristics of signaling or control messages, requests and responses; (4) identifying or developing NSE patterns intended to access, use, or control the desired attached functions, features, services or network infrastructure associated with a network; (5) developing the sequence of NSE patterns to be initiated or utilized to access, use, or control the desired attached functions, features, services or network infrastructure associated with a network.

In another aspect, the method can include one or more of the following steps, all or a portion of which can be utilized for measuring the performance of a signaling network or for accessing, using, or controlling attached functions, features, services or network infrastructure associated with a network. Such steps can comprise: (1) initiating and managing NSEs in a network or network element to measure the signaling or control performance; (2) togging and analyzing signaling or control timing metrics to determine the signaling or control performance; (3) initiating and managing one or more NSEs or NSE patterns, responses, replies, modifications or other NSE actions; (4) monitoring the signaling or control messages or the flow of signaling or control messages associated with the initiation, operation or utilization of Network Signaling Events (NSEs); (5) logging and analyzing the performance, timing, sequence and corresponding information of signaling or control messages or the signaling or control message flows; (6) identifying any desired responses to the signaling or control messages; and (7) generating any desired signaling or control modifications, responses, or NSEs.

In yet another aspect of the subject disclosure, an article of manufacture comprising a machine-readable storage medium that retains machine-executable instructions (e.g., computer-executable instructions) can cause a machine to perform the method(s) described herein in response to execution of such machine-executable instructions by at least one processor.

Additional aspects, features, or advantages of the subject disclosure will be set forth in part in the description which follows, and in part will be obvious from the description, or may be learned by practice of the subject disclosure. The advantages of the subject disclosure will be realized and attained by means of the elements and combinations particularly pointed out in the appended claims. It is to be understood that both the foregoing general description and the following detailed description are exemplary and explanatory only and are not restrictive of the subject disclosure.

BRIEF DESCRIPTION OF THE DRAWINGS

The accompanying drawings are incorporated and illustrate exemplary embodiment(s) of the subject disclosure and together with the description and claims appended hereto serve to explain various principles, features, or aspects of the subject disclosure.

DETAILED DESCRIPTION

Figure 1:
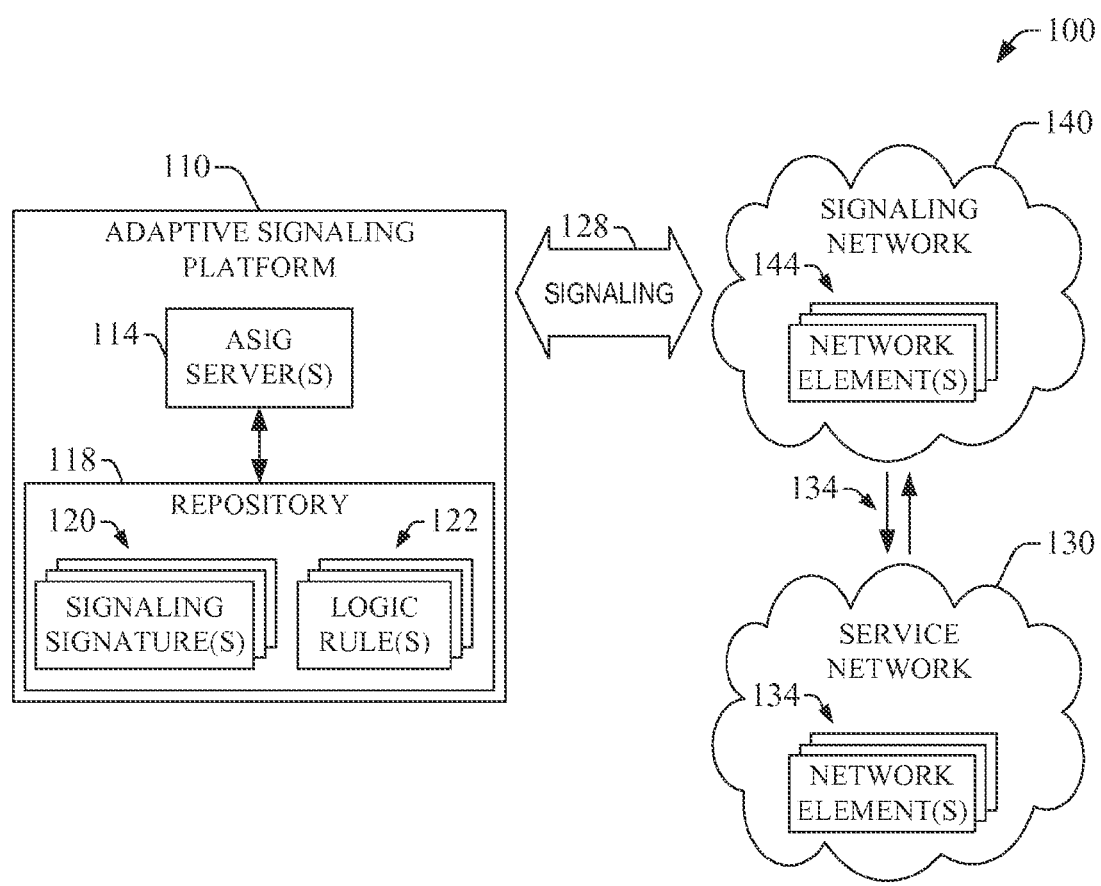
FIG. 1 illustrates an exemplary network environment that can operate in accordance with one or more aspects of the disclosure.

The subject disclosure may be understood more readily by reference to the following detailed description of exemplary embodiments of the subject disclosure and to the Figures and their previous and following description.

Before the present compounds, compositions, articles, devices, and/or methods are disclosed and described, it is to be understood that the subject disclosure is not limited to specific systems and methods for accessing attached functions, features, services and network infrastructure provided by such communication network elements on behalf of the party originating the communication session. It is also to be understood that the terminology used herein is for the purpose of describing particular embodiments only and is not intended to be limiting.

As utilized in the specification and the appended claims, the singular forms "a," "an" and "the" include plural referents unless the context clearly dictates otherwise. In addition, as utilized in the subject disclosure, an "attached function" can refer to a user connected to a network through a computing device, a network interface device, an attached device connected to the network, a function using the services of or providing services to the network, or an application associated with an attached device. Also, as utilized in the subject disclosure, "network infrastructure" can refer to a network computing device, a network interface device, an attached device connected to the network, a function using the services of or providing services to the network, or an application associated with an attached device, Such infrastructure can include software retained computer-readable storage media, hardware, or firmware or various combinations of hardware and software. Moreover, a "Network Signaling Event" (NSE) generally refers to a signaling or control message delivered to a network, to a network element associated or functionally coupled to the network, or to the signaling or control network of the network.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In the subject specification and in the claims which follow, reference may be made to a number of terms which shall be defined to have the following meanings: "Optional" or "optionally" means that the subsequently described event or circumstance may or may not occur, and that the description includes instances where said event or circumstance occurs and instances where it does not.

As employed in this specification and annexed drawings, the terms "unit," "component," "interface," "function," "sub-function," "system," "sub-system," "platform," and the like are intended to include a computer-related entity or an entity related to an operational apparatus with one or more specific functionalities, wherein the computer-related entity or the entity related to the operational apparatus can be either hardware, a combination of hardware and software, software, or software in execution. One or more of such entities are also referred to as "functional elements." As an example, a unit may be, but is not limited to being, a process running on a processor, a processor, an object, an executable computer program, a thread of execution, a program, a memory (e.g., a hard disc drive), and/or a computer. As another example, a unit can be an apparatus with specific functionality provided by mechanical parts operated by electric or electronic circuitry which is operated by a software or a firmware application executed by a processor, wherein the processor can be internal or external to the apparatus and executes at least a part of the software or firmware application. In addition or in the alternative, a unit can provide specific functionality based on physical structure or specific arrangement of hardware elements. As yet another example, a unit can be an apparatus that provides specific functionality through electronic functional elements without mechanical parts, the electronic functional elements can include a processor therein to execute software or firmware that provides at least in part the functionality of the electronic functional elements. An illustration of such apparatus can be control circuitry, such as a programmable logic controller. The foregoing example and related illustrations are but a few examples and are not intended to be limiting. Moreover, while such illustrations are presented for a unit, the foregoing examples also apply to a component, a system, a platform, and the like. It is noted that in certain embodiments, or in connection with certain aspects or features thereof, the terms "unit," "component," "system," "interface," "platform" can be utilized interchangeably. Certain functional elements of the disclosure can be implemented (e.g., performed) by software, hardware, or a combination of software and hardware.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Reference will now be made in detail to the various embodiment(s), aspects, and features of the subject disclosure, example(s) of which are illustrated in the accompanying drawings. Wherever possible, the same reference numbers are used throughout the drawings to refer to the same or like parts.

As described in greater detail below, the subject disclosure relates to measuring the performance of a signaling network and to accessing, using, or controlling attached functions, features, services or network infrastructure associated with a network through the management of signaling or control protocols in the network. Generally, in various aspects, the disclosure provides a method for permitting the originator of a session to measure the performance of a signaling network or to access, use, or control an attached function in a destination network. In one or more embodiments, a user serves as the origination source and intends to access, use, or control an attached function in the destination network, in this example a voicemail server, in order to deliver a voicemail message without ringing the recipient's phone.

As an illustration, in one exemplary embodiment, adaptive signaling technology can be exploited to enable a caller to deliver a message directly into the voice mailbox of a mobile telephone subscriber without calling the mobile user's phone or establishing a call to the mobile handset. Calling Party A wishes to leave Called Party B a voice message via voicemail, a common communications service in the United States. However, if Calling Party A does not wish to disturb Called Party B by calling their phone, Calling Party A really has no option to deliver the voice message directly to Called Party B's voice mailbox. Instead, because voicemail was established by the communications companies as a subtending or fallback service to a regular phone call, Calling Party A has no choice other than to place a telephone call to Called Party B, and ring Called Party B's telephone—thus disturbing Called Party B. Then, perhaps the call can transfer to voicemail, or perhaps Called Party B can pick up. Thus, in conventional systems, the outcome of the communications is not controllable by the Calling party.

It is possible to modify the outcome of the foregoing exemplary embodiment to send Calling Party A's call straight to the voice mailbox of Called Party B by using the telephone signaling or control network described herein. An exemplary implementation can be the case of a celebrity who wishes to communicate with her fan club using a voice based service. Now, the celebrity can drop her recorded message right into the voice mailboxes of her fan club members without ringing their phones and intruding on the fan's day, or risking the fans picking up and answering the call. Through the use of network signaling event (NSE) patterns that operate under specific timing constraints and by monitoring and analyzing the signaling or control message flow, then by responding adaptively to the signaling flow of the network, access to, or the use or control of, attached functions, features and services (such as voicemail) provided by those network elements can be reliably accessed, used, or controlled on behalf of the user or attached function.

In additional or alternative embodiments, adaptive signaling technology can be exploited to determine whether a telephone number assigned to a mobile or cellular telephone service is a working number or not. Conventional techniques can be applied to determine whether a telephone number is assigned to a mobile telephony provider versus a landline telephony provider. Yet, it generally is significantly more difficult to determine whether a number assigned to a mobile provider is assigned to a working subscriber or not. In certain scenarios, over 20% of mobile telephone numbers that are assigned to a wireless carrier can be actually non-working numbers that are not assigned to a working subscriber service. Unassigned mobile telephone numbers may be held in inventory by the mobile provider for future use by new mobile subscribers, or such numbers can be held as non-working numbers for extended periods of time after a subscriber cancels their mobile telephone service. For entities or organizations that wish to maintain accurate contact lists of mobile telephone numbers, inability to ascertain whether a mobile phone number is in or out of service (e.g., a working number) can be disruptive to their operations. For example, in the debt collection commercial space, the fact that a person's mobile phone has recently gone out of service can be predictive that the person may not pay their next debt installment on time. However, because collections companies are limited by U.S. law as to the number of communications they can make to collect a debt, collections companies may prefer not to call the mobile number directly to determine whether it is working or not. For such organizations, having a mechanism (system, method, system and method, etc.) of validating if a mobile number is still working that does not "count against them" as a collections contact appears to be a potential source of efficiency in cases in which such organizations intend to utilize the predictive nature of the working status of a mobile number while remaining in regulatory compliance with their debt collection practices.

In such exemplary embodiment, adaptive signaling can be exploited to access the mobile number to determine whether the mobile number exhibits the signaling signatures associated with a working mobile telephone service or the signaling signatures associated with a Central Office Recording (thus indicating it is no longer in service). Accordingly, the debt collections agency may be able to determine the status of a mobile telephone number without actually calling subscriber's mobile telephone number. Such technique, enabled by embodiments described herein, can afford collections companies to exploit the predictive nature of knowing the working status of a mobile telephone number without intruding on the subscriber linked to the mobile telephone number, or violating debt collection policies and regulations.

The exemplary embodiments described herein can utilize this adaptive signaling approach in novel ways in order to generate access to, or the use or control of, functions, features, services and network infrastructure provided by networks and network elements.

Beyond peering inside the message packet, the various embodiments of the subject disclosure can analyze the flow of messages with respect to the sequence of message types, the timing of various types of messages and timing between various types of messages (or inter message timing), and the presence or absence and type of message response from the signaling or control network. It should be appreciated that this is significantly less intrusive and less computational intensive process than commonly utilized by Intrusion Detection Systems (IDSs) that operate in the signaling or control plane of a network, often for the purpose of providing network security. Furthermore, instead of being focused on network security, in one exemplary application, the subject disclosure is directed to providing access to, or the use or control of, attached functions, features, services or network infrastructure elements.

In one aspect, the disclosure, and related embodiments, can exploit adaptive signaling to monitor, analyze and detect the signaling signatures of networks and their network elements. In addition, adaptive signaling applies intelligence regarding the signaling or control message types, the signaling or control message content, the timing of and between signaling or control messages, the duration of and the sequence of signaling or control messages flowing in a network. Application of such intelligence can permit to generate access to, or to use, or control attached functions, features, services and network infrastructure provided by networks and network elements as desired by the originating or requesting party.

Referring to the drawings, FIG. 1 is a block diagram of an exemplary network environment 100 that can operate in accordance with one or more aspects of the disclosure. In the illustrated embodiment, the adaptive signaling platform 110 can be coupled to the signaling network 140 via link(s) 128, which can comprise one or more of wireless link(s), wireline reference link(s) or the like. The adaptive signaling platform 110 can comprise one or more servers 114, referred to as ASIG server(s) 114, which can generate signaling that can be transmitted to one or more network elements 134 in the service network 130 (e.g., a telecommunication network, a cable network, a wide area network, an industrial network, or the like). The ASIG server(s) 114 also can receive signaling from network element(s) 134. In another aspect, the ASIG server(s) 114 can transmit signaling to the one or more network element(s) 144 in signaling network 140. The service network 130 can exchange signaling with the signaling network 140. The one or more network elements 134 and the one or more network elements 144 can comprise switches, routers, and/or special purpose computing devices (e.g., servers) that can exchange traffic and signaling according to a signaling protocol (e.g., a control protocol).

As illustrated, the one or more ASIG servers 114 can be external to the service network 130. Accordingly, the type of signaling that can be transmitted to a network element (e.g., one of network element(s) 134) in the service network 130 can be a specific subset of one or more control messages of a plurality of control messages available in a signaling protocol utilized by the service network 130 for network administration and to provide specific functionality, such as call sessions (including data sessions and voice sessions), voicemail services, data services (e.g., cloud storage and management), data or information service services (e.g., video streaming service, video-on-demand services, or the like). The plurality of control messages can be available to an administrator (e.g., an owner or lessee or the service network 130) for intra-network operation or administration of the service network 140 and to provide service. Similarly, the one or more ASIG servers 114 can be external to the signaling network 140 (e.g., a signaling system 7 network) and, therefore, the type of signaling that an ASIG server can transmit to a network element (e.g., one of network element(s) 144) of the signaling network 140 can be a specific subset of one or more control messages of a plurality of control messages available in a signaling protocol utilized by the signaling network 140 to provide specific functionality, such as call establishment, call tear down, call retry, call busy signaling or other exception handling messaging, and the like.

It should be appreciated that a signaling protocol utilized by the service network 130 and/or the signaling network 140 can be a standardized signaling protocol such as session initiation protocol (SIP), signaling system 7 (SS7), point to point protocol over Ethernet (PPPoE), transmission control protocol/internet protocol (TCP/IP), Internet Protocol (IP), such as IPv4, International Telecommunication Union (ITU) standard H.323, realtime transport protocol (RIP), real time streaming protocol (RTSP), and the like. In a scenario in which the signaling protocol is SIP, the adaptive signaling platform 110 can be permitted to transmit and/or receive the following group of control messages: an INVITE, which is a request for creation of a SIP session; an ACK, which is an acknowledgement message typically transmitted by a device in the service network 130 and/or the signaling network 140 (such device can be referred to as a third party device) in response to an INVITE; a CANCEL, which is control message that cancels a pending request; a BYE, which terminates a SIP session; a PRACK, which is a provisional acknowledgement message; and an UPDATE, which is a control message that enables a client (or client device) to update one or more parameters of an established SIP session. It should be appreciated that other SIP control messages, such as SIP responses (or, more generally, signaling response) including SIP 18X (SIP 182, SIP 183, etc.), SIP 487, and SIP 200:0K, can be received at the one or more ASIG server(s) 114. In certain embodiments, a device within the signaling network 140 can be a mobile telephone; a computer, either tethered or wireless, a voice-over-IP (VoIP) telephone (or softphone), etc.

For a specific functionality (e.g., call session establishment, or voicemail service), a network element of the one or more network elements 134 can implement signaling in a particular manner to provide the specific functionality, while the signaling remains compliant with a signaling protocol (e.g., SIP) utilized for communication (e.g., transmission and reception) of such signaling. In one aspect, specific features of implementation (e.g., configuration and performance) of such signaling, which can be referred to as signaling protocol, can yield a particular pattern of signaling. In one aspect, the particular pattern of signaling can be unique to the network element and related specific functionality and, therefore, can be referred to as a signaling signature. The pattern of signaling can include specific control message types, specific sequencing of control messages, specific timing of communication, e.g., transmission and reception, of control messages, and specific timing between control messages.

In one aspect, for the specific functionality, an ASIG server of the one more ASIG servers 114 can monitor signaling (e.g., control messages) transmitted to and received from one or more network elements in the service network 130 and/or signaling network 140. Monitoring such signaling can produce a wealth of signaling information that the ASIG server can record (for example, in a database) and analyze. In one aspect, as part of the analysis performed by the ASIG server, one or more patterns of signaling, or signaling signatures, can be determined (see, e.g., FIG. 2B). One or more of such signaling signatures can be retained in a repository 118 in one or more memory elements 120, represented as logic rule(s) 122. Each memory element of the one or more memory elements can be embodied in a register, a memory page, a file, a database, or the like. Certain signaling signatures can be utilized for accessing attached functions, features, services, or network infrastructure associated with the service network 130, whereas other signaling signatures can be utilized fir monitoring and/or ensuring that access to a desired attached function, feature, service, or network infrastructure can be achieved. In another aspect, as part of the analysis of signaling information, the ASIG server can generate a set of one or more logic rules representative of the one or more signaling signatures. The set of one or more logic rules can be retained in the repository 118 in one or more memory elements 122, represented as signaling signature(s) 120. Each memory element of the one or more memory elements can be embodied in a register, a memory page, a file, a database, or the like. Application of at least one (e.g., one, two, more than two, or each) of the logic rules in the set can adapt signaling transmitted to service network 130 and/or the signaling network 140 to operational behavior of the signaling network 140. Accordingly, signaling transmitted to one or more of the service network 130 or the signaling network 140 in accordance with one or more of the logic rules can be referred to as "adaptive signaling."

In certain embodiments, the adaptive signaling platform 110, via an ASIG server of the one or more ASIG severs 114, can utilize the signaling signatures to determine a network signaling event and inject signaling associated with the NSE into the service network 130 and/or the signaling network 140. In one aspect, through injection of one or more NSEs at specific times during a service session (e.g., a call session) the signaling performance of a network element (e.g., one of network element(s) 134 or one of network element(s) 144) can be measured, or a specific functionality of the service network 130 can be accessed. As described herein, the specific times can be adapted to current network conditions.

In one aspect, for a signaling protocol based on a request-response transaction model, the adaptive signaling platform 110 can inject (e.g., transmit to a network) one or more NSEs based on signaling flow dictated by one or more signaling signatures rather than transmitting a request and awaiting for a specific response to the request. Such signaling flow can comprise timing of control messages; timing between each type of control messages; time elapsed between signaling in a NSE or other signaling transaction, such as time elapsed between transmission of a first NSE and a second NSE; sequence of signaling messages in a signaling signature or control flow associated with specific functionality (e.g., voicemail service); and/or presence or absence of certain control messages.

FIGS. 2A-2D illustrate exemplary signaling structure of a network signaling event, a pattern of NSEs, and sequences of NSEs in accordance with one or more aspects of the disclosure. As illustrated, an exemplary network signaling event (NSE) 200 comprises two control messages, CM1 and CM2, which are delivered at specific times, t and t', respectively. In certain implementations, CM1 and CM2 can be delivered to a network element (e.g., a local switch, a session border controller, or the like) of a service network or a signaling network. In one aspect, CM1 can be a request message according to a specific signaling protocol, and CM2 can be a control message that terminates such request message. For instance, CM1 can be a SIP INVITE message and CM2 can be a SIP CANCEL or CM1 can be a Signaling System 7 Initial Address Message (IAM) and CM2 can be a Signaling System 7 Release (REL) message. It should be appreciated that the time span t-t' of the NSE 200 is divided into two intervals: a delay $\delta t$ and a NSE duration $\Delta t$. The delay is the time interval elapsed from initiation (e.g., configuration) of the first control message CM1 and transmission thereof to a network element. The magnitude of the time interval can be determined, in one aspect, by processing time incurred at one or more functional elements (e.g., a processor, a bus or other link(s), and the like) that generate, configure for transmission, and transmit the first control message CM1.

A plurality of NSEs can form a pattern of NSEs. Such pattern can be referred to as a signaling iteration. In certain embodiments, a single pattern of NSEs can be utilized to measure signaling performance of a network element (e.g., one of network element(s) 134 or one of network element(s) 144). In one aspect, each one of the plurality of NSEs can have the signaling structure of exemplary NSE 200 and a specific time span (delay and duration). The time span of the pattern of NSEs can be determined by the time a request control message is initiated in the first NSE in the pattern of NSEs and a termination control message is transmitted in the last NSE in the pattern of NSEs. In another aspect, in the pattern of NSEs, two or more NSEs can be concurrent, e.g., a request control message of a first NSE may be "active" or non-terminated while a second NSE is initiated. As illustrated in FIG. 2B, the exemplary pattern 220 comprises four NSEs (NSE1, NSE2, NSE3, and NSE4) and has three pairs of concurrent NSEs: NSE1 and NSE2, NSE2 and NSE3, and NSE3 and NSE4.

Two or more patterns of NSEs can be combined to form a sequence of patterns that can be utilized to access attached functions, features, services or network infrastructure (e.g., a voicemail server) associated with a network, such as service network 130. The sequence of patterns can be referred to as a signaling signature. FIG. 2C illustrates an exemplary sequence of patterns of NSEs 240 having four patterns (pattern 0, pattern 1, pattern 2, and pattern 3) spanning a time interval $t_0$-$t_4$. In certain embodiments, an initial pattern (e.g., pattern 0) in a sequence of patterns can be transmitted to measure signaling performance of a network element.

Specific signaling signatures in a sequence can establish a NSE model. FIG. 2D illustrates a portion of an exemplary NSE model 260. In such model, Pattern 0 can be utilized to measure signaling performance of a network element and Pattern 1 can be utilized to access specific user-plane functionality (e.g., voicemail service) and related network infrastructure. As described herein, two or more NSEs can be concurrent, which is illustrated as grey blocks in timeline of Pattern 1. In one aspect, inter-NSE logic rules can be applied to such concurrent NSEs. In another aspect, in portions of time during the time span of a pattern of NSEs in which an NSE is transmitted without concurrency, intra-NSE logic rules can be applied. Inter-NSE logic rule(s) and intra-NSE logic rule(s) can be applied as part of accessing a specific attached function, feature, or service of a network.

Figure 3:
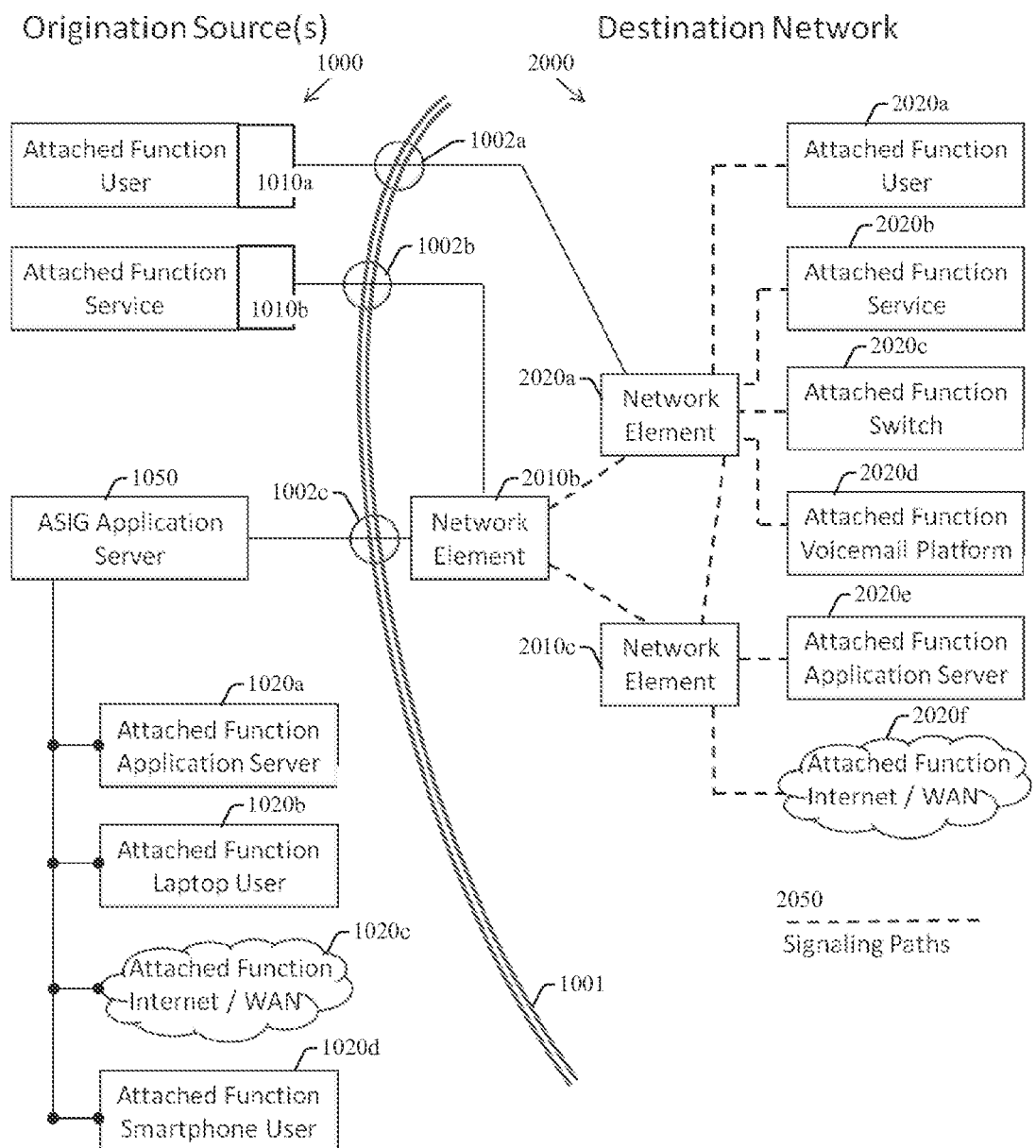
FIG. 3 illustrates a high-level block diagram of exemplary interconnection of network infrastructure devices and attached functions in accordance with one or more aspects of the disclosure.

FIG. 3 illustrates a high-level block diagram of exemplary interconnection of network infrastructure devices and attached functions in accordance with aspects of the subject disclosure. In FIG. 3, a set of one or more origination source(s) 1000 are depicted representing a variety of possible types of Attached Functions. These Attached Functions generally represent one or more of users, applications, or equipment that attempts to originate a session with another Attached Function located in a destination network 2000. Origination source(s) 1000 also includes a network infrastructure 1001 and one or more attached functions connected to or connectable to a network infrastructure 1001 by way of connection points (e.g., 1002*a-c*).

In one aspect, functional elements illustrated in FIG. 3 can be deployed as a hosted service in which exemplary attached functions (e.g., functions 1020*a*, 1020*b*, and 1020*c*) are remotely connected to the ASIG Application Server 1050 (e.g., an ASIG server of the one or more ASIG server(s) 114) which can connect to the network infrastructure 1001 through connection point 1002*c*. In an embodiment, the ASIG Application Server 1050 can provide various functional features of the subject disclosure, and the remotely attached functions (e.g., functions 1020*a*, 1020*b*, and 1020*c*) can utilize the services (e.g., functionality) of the ASIG Application Server 1050 in order to access, use, or control the functionality of method(s) and system(s) of the disclosure. In certain embodiments, ASIG Application Server 1050 can employ both hardware and software (e.g., a function embodied in an application executing on ASIG Application Server 1050) to provide functionality in accordance with aspects of the subject disclosure as part of this type of hosted service embodiment.

As an example, additional attached functions are depicted including a Smartphone user 1020*d* which is remotely connected to the ASIG application Server 1050, wherein the such server provides the Smartphone user the functionality afforded by the various embodiments of the subject disclosure described herein. Additional exemplary origination sources can include attached functions such as an attached function User 1010*a* and an Attached Function Service 1010*b* in which a localized implementation is depicted. In a localized implementation, such as those of functions 1010*a* and 1010*b*, the functionality of the subject disclosure can be locally deployed within the attached function itself; for instance, in such implementation, at least one (e.g., one, two, more than two, or all) the functions provided herein can reside in a single device.

Network infrastructure 1001 can include multiple switching devices, routing devices, firewalls, access points (APs), metropolitan access networks (MANs), wide area networks (WANs), virtual private networks (VPNs), telephony switches, feature and communications servers, application servers, internet connectivity, or other network or communication components that can be functionally coupled to the attached functions through connection points (e.g., 1002*a-c*).

Destination network 2000 can contain a variety of attached functions (e.g., functions 2020*a-f*) including users, services, switches, voicemail platforms, application servers, internet connectivity, etc. In addition or in the alternative, destination network 2000 can contain a variety of network elements (components, units, servers, platforms, switches, routers, functions, etc.), such as network elements 2010*a-c*. In one or more embodiments, such network elements (e.g., network elements 2010*a-c*) can comprise devices such as switching devices, routing devices, firewalls, access points, MANs, WANs, VPNs, telephony switches, feature and communications servers, application servers, interact connectivity, or other network or communication components. In one aspect, such network elements (e.g., network elements 2010*a-c*) can, individually and independently or in conjunction with attached functions (e.g., functions 2020*a-f*), provide services such as telephone calls, voicemail services, database services, video or other data or information services. In another aspect, such network elements (e.g., network elements 2010*a-c*) and the attached functions (e.g., functions 2020*a-f*) typically communicate with each other through signaling paths 2050 signaling paths are represented by dashed lines in FIG. 3. Such signaling paths are typically logical paths, yet in some scenarios such paths also can be or can include physical paths, that enable the communication between network elements (e.g., 2010*a-c*), between attached functions (e.g., 2020*a-f*), and between attached functions (e.g., 2020*a-f*) and network elements (e.g., 2010*a-c*). In another aspect, as described herein, such communications typically use industry standard signaling or control protocols such as session initiation protocol (SIP), signaling system 7 (SS7), point to point protocol over Ethernet (PPPoE), transmission control protocol/internet protocol (TCP/IP), International Telecommunication Union (ITU) standard H.323, realtime transport protocol (RTP), real time streaming protocol (RTSP), and the like.

Figure 4:
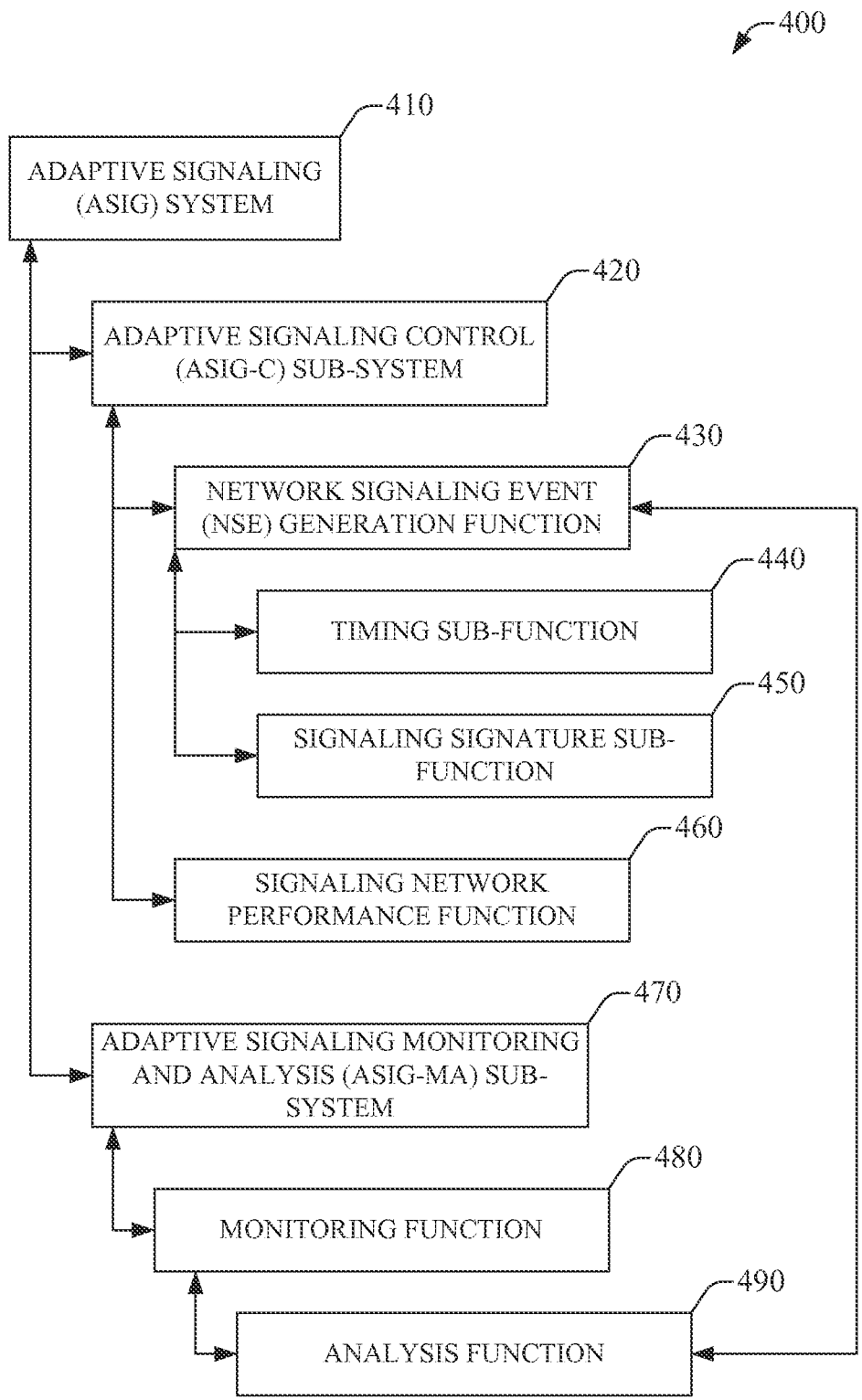
FIG. 4 illustrates an exemplary embodiment of an adaptive signaling system, related sub-systems, functions, and sub-functions in accordance with one or more aspects of the disclosure.

FIG. 4 illustrates a hierarchical block-diagram representation of an exemplary system 400 in accordance with one or more aspects of the disclosure. In one embodiment, the exemplary system 400 can be embodied in a plurality of computer-executable instructions stored in a memory (e.g., repository 118), which can be included in an ASIG server or functionally coupled thereto. In another embodiment, one or more functional elements of the exemplary system 400 can be embodied in functionality specific hardware. In yet another embodiment, one or more functional elements of the exemplary system 400 can be hardware having software (e.g., computer-executable instructions) that, in response to execution by a processor, provide the functionality of the one or more functional elements in accordance with aspects described herein. In certain implementation at least one ASIG server of the one or more ASIG servers 114 can comprise (e.g., retained in memory or as part of hardware) the exemplary system 400. As illustrated, the exemplary system 400 comprises an adaptive signaling (ASIG) system 410, related sub-systems, functions, and sub-functions. The adaptive signaling system 410, sub-systems, functions and sub-functions of the illustrated exemplary system 400 are depicted as a hierarchical block diagram. The adaptive signaling system 410 can comprise at least two subsystems: The adaptive signaling control (ASIG-C) sub-system 420 and the adaptive signaling monitoring and analysis (ASIG-MA) sub-system 470. It can be appreciated that the ASIG sub-system 420 also is illustrated in a hierarchical block diagram. Such ASIG sub-system 420 can be an adaptive signaling control (ASIG-C) subsystem that can comprise a set of functions and sub-functions that can be utilized to control the generation and operation of network signaling events (NSEs) in accordance with one or more aspects described herein.

Figure 2A:
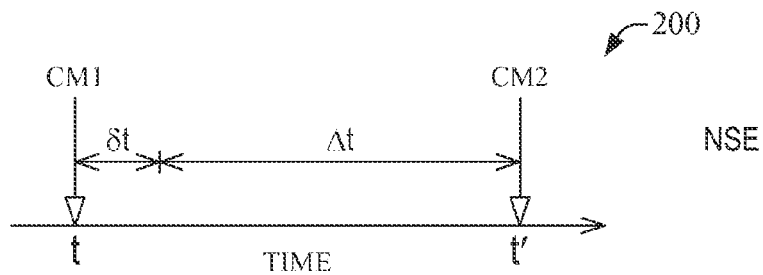
FIGS. 2A-2D illustrate exemplary signaling structure of a network signaling event, a pattern of NSEs, and sequences of NSEs in accordance with one or more aspects of the disclosure.
Figure 2B:
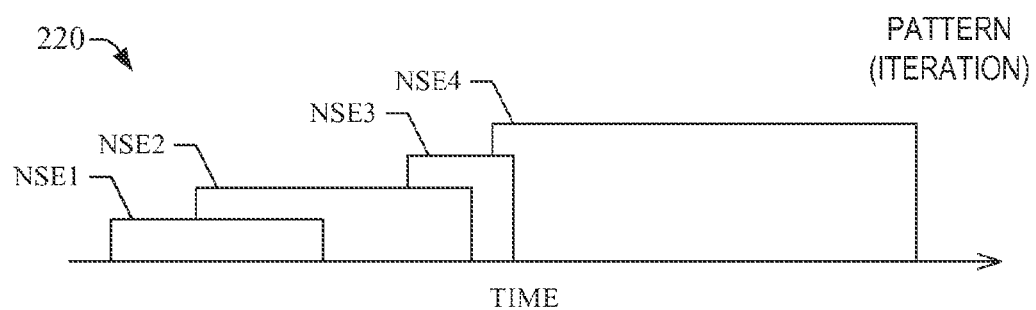
Figure 2C:
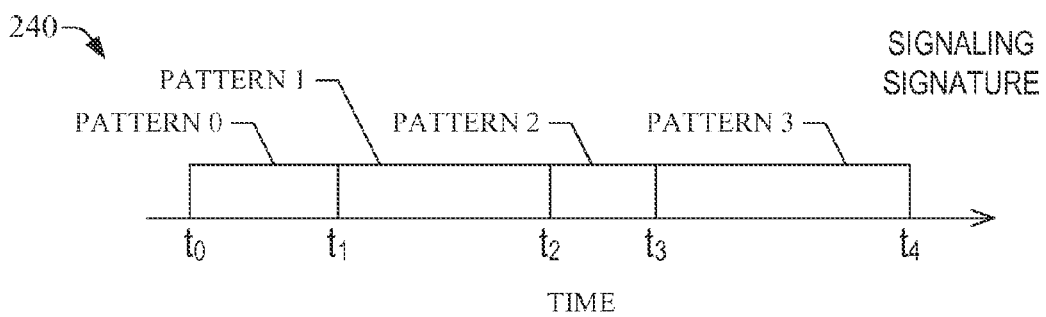
Figure 2D:
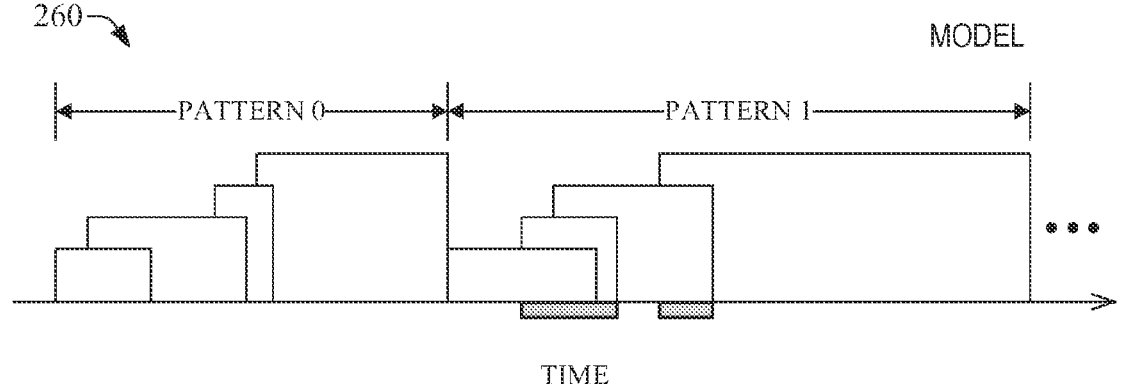

In one aspect, a NSE generation function 430 can produce the signaling or control messages that can form a NSE (e.g., NSE 200 in FIG. 2A). In another aspect, the NSE generation function 430 can maintain a session state, and can implement appropriate signaling or control protocol replies and/or responses. It should be appreciated that commercially available and opensource computer programs, such as signaling "stacks," can be available to provide such NSE generation capability. In the illustrated embodiment, NSE generation function 430 can include a timing sub-function 440 that controls the timing and duration of NSEs, and a signaling signature sub-function 450 that can manage a pattern (also referred to as a "signaling signature") of NSEs that can be generated by the NSE generation function 430.

It should be appreciated that precision of the timing sub-function 440 can be an important aspect of the exemplary system 400. In view that signaling or control messages can transpire quickly and their implementation with respect to timing across various network elements and associated functions may not be applied uniformly, temporal resolution of the timing sub-function 440 is generally desired to be precise. In one aspect, a timer function can be associated with an operating system (OS) being executed in a computing environment. It should be appreciated that operating systems (OSs) that can operate at a micro-second capability timers are available from a variety of commercially available and opensource resources.

In one aspect, the resolution of time values produced by the timer can be important (and even critical in certain embodiments). A lack of precision in the timing of signaling messages injected into a destination network (e.g., signaling network 140) can lead to unintended consequences or not being able to access a specific service of attached function of a network. Certain aspects of a suitable timer include: (i) Resolution. A suitable timer can measure time at the minute and second level, at the millisecond level or even at the microsecond level. A timer suitable for operation of the adaptive signaling platform 110 can a minimum of millisecond resolution, which can be afforded by certain operating systems, such as the Ubuntu Operating System. (ii) Stabilization Interval. Once initiated, a time interval elapsed before the timer can stabilize and achieve an optimal or nearly-optimal level of accuracy. In one embodiment, an ASIG system (e.g., exemplary system 400) based on the Ubuntu OS can provide timers that stabilize after about 20 milliseconds. Such timing constraints can prevent or make difficult certain implementation with opensource operating systems having excessive overhead to maintain accurate timing. In one embodiment, an ASIG-server of the one or more ASIG server(s) 114 can be or can comprise a SIP stack (or stack computer) utilizing Ubuntu's precision timers.

In one or more embodiments, the signaling signature sub-function 450 can be implemented as a configuration file retained in memory, wherein the NSE generation function 430 can access (e.g., read) the configuration file. The signaling signature sub-function 450 can retain the pattern of NSEs that can be used to measure signaling network performance or to access, use, or control the desired attached function, feature, service, or network infrastructure. The pattern, or Signaling Signature, can comprise the type and the number of NSEs to be initiated, managed and monitored, the timing of NSE initiation, or the duration of NSEs. In one aspect, transmitting a series of NSEs at specific times to one or more network elements and measuring the performance of a signaling network in response to such NSEs can be used to ascertain the current performance and operational characteristics of the signaling network. Furthermore, transmitting a series of specifically timed network signaling events to the destination switch may cause the call processing program of the destination switch to automatically establish a call directly to the voicemail server that is attached to the destination switch (e.g., a telephone switch). In such one or more embodiments, advantage can be taken of the fact that the manner in which various telephone switch manufacturers typically deploy a call handling protocol associated with, for example, sending a call to voicemail has distinct patterns that can vary among switch manufacturers. In one aspect, by selecting a Signaling Signature that has one or more NSEs transmitted to a telephone switch at specific intervals, with specific durations, and by applying adaptive signaling logic associated with the timing of signaling or control message responses or replies from the network, the timing between signaling or control message responses or replies from the network, the presence or absence of certain signaling or control message responses or replies from the network, and content of signaling or control message responses or replies from the network, the intended effect of accessing a specific functionality of the network can be achieved. For example, sending a call straight to voicemail without calling a telephone associated with the voicemail service can be achieved in accordance with one or more aspects described herein. It should be appreciated that in certain embodiments of the disclosure, an ASIG server of the one or more ASIG servers 114 can implement a machine-learning stage in which signaling signatures, timing, sequence of NSEs, and the like, can be learned for most any switch manufacturer or vendor. To at least such end, the ASIG server can implement various artificial intelligence techniques executed on signaling information collected in accordance with aspects of the disclosure.

Table 1 presents an exemplary Signaling Signatures in accordance with one or more aspects of the disclosure. In one aspect, the Signaling Signature can be utilized for determining the performance of a signaling network. As an example, the exemplary signaling signatures can be utilized to determine whether a current performance characteristic of the signaling network can be suitable to fulfill specific (e.g., precise) timing requirements of subsequent Signaling Signatures which can be used to access a specific functionality (e.g., an attached function or service) of a destination network. In one embodiment, the signaling signature referred to as Performance Measurement Signaling Configuration in Table 1 can be transmitted via the signaling network and can be monitored and analyzed (e.g., via ASIG-MA sub-system 470) to determine the performance of the signaling network. In such embodiment, NSE1 can be utilized to determine whether a network element (e.g., element 2010b) utilized to access the destination network (e.g., network 2000) exhibits current performance characteristics suitable for processing subsequent signaling signatures. In one aspect, suitable performance characteristics can include one or more of response processing time to NSE1 or the presence of signaling messages indicative of an overload condition on the network element (ex. SIP 486 or SIP 503 messages). In addition or in the alternative, in such embodiment, NSE4 can be utilized to determine a current performance characteristic of a signaling network functionally coupled to the destination network for an attached function (e.g., attached function 2020a, attached function 2020b, attached function 2020c, attached function 2020d, attached function 2020e, or attached function 2020f, or a combination thereof) in the destination network (e.g., network 2000). In such embodiment, for example, the interval between the initiation of NSE4 (as illustrated in Table 1) and the elapsed time of a response from the destination network or a network element thereof to NSE4 can be extracted.

ing a similar data structure as the files illustrated at Table 2 can be utilized to access specific functionality of a destination network (e.g., service network 130). It should be appreciated that while the exemplary signaling signatures utilized to access voicemail service and illustrated at Table 2 can comprise two or more NSEs in each iteration or pattern of NSEs, other end-user functionality in other types of networks (such as a TCP/IP network) can be accessed, for example, based on the timing of a single NSE, such timing comprising, for example, a set of two or more instants at which control messages are transmitted and the duration of the single NSE. In one embodiment, upon or after transmitting the signaling signature utilized for performance measurement (see, e.g., Table 1), as an initial iteration (e.g., Iteration 1) of the configuration file, subsequent signaling signatures (conveyed in subsequent iterations), such as those illustrated in Table 2, can be attempted. In one embodiment, a signaling signature configuration file (e.g., 3XX model) can be attempted. In constructing a signaling signature to be utilized, an actual performance value derived from NSE4 of the performance measurement signaling signature can be added to the 18X timeout (TO) value of the signaling signatures illustrated in Table 2 to adapt the signaling signature to the current performance of a signaling network or network element associated with a network that provides an attached function (e.g., user-plane functionality) that is to be accessed.

In one scenario, if an iteration of the attempted configuration file see, e.g., Table 2) does not access the attached function (e.g., voicemail functionality) as intended, and if subsequent attempts are not overridden by logic rules that can be managed by the adaptive signaling monitoring and analysis (ASIG-MA) sub-system 470, then additional iterations can be attempted until such iterations (which can reside in a file in

TABLE 1

Exemplary signaling signatures for measurement of performance of a signaling or control network.

| Iteration | NSE1 Delay (ms) | NSE1 Duration (ms) | NSE2 Delay (ms) | NSE2 Duration (ms) | NSE3 Delay (ms) | NSE3 Duration (ms) | NSE4 Delay (ms) | NSE 4 Duration (ms) | 18X Timeout (ms) | 200 Timeout (ms) |
|---|---|---|---|---|---|---|---|---|---|---|
| 1 | 130 | 500 | −1 | 0 | 152 | 500 | 165 | 2700 | 2500 | 40 |

Table 2 presents two exemplary signaling signature configuration files in accordance with one or more aspects of the disclosure. In one aspect, such configuration files can be utilized to access a voicemail server, in order to deliver a voicemail message without calling the recipient's phone. More generally, signaling signature configuration files hava memory at ASIG application server, for example) are exhausted. If the ASIG-MA sub-system 470 determines that the NSE pattern is unable to access the intended attached function (e.g., voicemail functionality), an alternative Signaling Signature configuration file (e.g., PXX model) can be attempted.

TABLE 2

Exemplary signaling signatures configuration files for direct voicemail access in accordance with one or more aspects of the disclosure.

| Iteration | NSE1 Delay (ms) | NSE1 Duration (ms) | NSE2 Delay (ms) | NSE2 Duration (ms) | NSE3 Delay (ms) | NSE3 Duration (ms) | NSE4 Delay (ms) | NSE 4 Duration (ms) | 18X Timeout (ms) | 200 Timeout (ms) |
|---|---|---|---|---|---|---|---|---|---|---|
| 3XX Model | | | | | | | | | | |
| 1 | 130 | 1600 | 152 | 1600 | 158 | 1750 | 165 | 3300 | 2000 | 1000 |
| 2 | 130 | 1600 | 152 | 1600 | 173 | 1800 | 178 | 3300 | 2000 | 1300 |
| PPX Model | | | | | | | | | | |
| 1 | 100 | 1750 | −1 | 0 | 140 | 5000 | 160 | 6000 | 5000 | 1500 |
| 2 | 100 | 1750 | −1 | 0 | 140 | 5500 | 160 | 6000 | 5000 | 1500 |

TABLE 3

Exemplary Signaling Signatures configuration files for direct voicemail access in accordance with one or more aspects of the disclosure.

| Iteration | NSE1 Delay (ms) | NSE1 Duration (ms) | NSE2 Delay (ms) | NSE2 Duration (ms) | NSE3 Delay (ms) | NSE3 Duration (ms) | NSE4 Delay (ms) | NSE 4 Duration (ms) | 18X Timeout (ms) | 200 Timeout (ms) |
|---|---|---|---|---|---|---|---|---|---|---|
| 3XX0 Model | | | | | | | | | | |
| 1 | 100 | 700 | 152 | 800 | 158 | 950 | 175 | 1100 | 1250 | 40 |
| 2 | 100 | 1700 | 152 | 1800 | 158 | 1950 | 175 | 3800 | 3200 | 2500 |
| 3 | 4100 | 1800 | 4152 | 1950 | 4158 | 1950 | 175 | 4000 | 3300 | 2750 |
| 4 | 100 | 700 | 152 | 1950 | 173 | 1950 | 175 | 3800 | 600 | 2750 |
| PXX0 Model | | | | | | | | | | |
| 1 | 100 | 300 | −1 | 0 | 173 | 1700 | 175 | 5000 | 3100 | 3500 |
| 2 | 4100 | 300 | 4152 | 1800 | 4173 | 1800 | 4175 | 5100 | 3500 | 3600 |
| 3 | 100 | 300 | 1152 | 1750 | 1173 | 1750 | 1175 | 5250 | 1000 | 3750 |

In Tables 1-3, "NSE Delay" fields indicate the delay from an initial instant (e.g., t=0) at which a control message in the NSE is initiated to the time the control message is transmitted, and "NSE Duration" fields indicated the total duration of the NSE. In the illustrated embodiment, the "18X Timeout" field represents the amount of time allowed from NSE Initiation to the receipt of a signaling response in the SIP 18X series (e.g. 180, 181, 183, and so forth). The "200 Timeout" field indicates the portion of time permitted to elapse from receipt of a signaling response in the SIP 18X series (e.g., 180, 181, 183, and so forth) series signaling response to receipt of a SIP 200:0K signaling response message.

Another function associated with the adaptive signaling control (ASIG-C) subsystem is the signaling network performance function 460. Such function can measure the current performance characteristics of the signaling network and can intervene in the operation of the NSE Generation Function 430 in response to detecting that the current performance of the signaling or control network is not satisfactory to support the precision of timing required or intended by the timing sub-function 440 or the signaling signature sub-function 450.

The second ASIG Subsystem is an adaptive signaling monitoring and analysis (ASIG-MA) Subsystem 470. The ASIG-MA Subsystem is responsible for monitoring, analyzing and determining appropriate responses to signaling or control messages or the flow of signaling or control messages generated or operated upon by the previously described adaptive signaling Control (ASIG-C) Subsystem. Like the ASIG-C Control Subsystem, the ASIG-MA Monitoring Subsystem includes a set of Functions.

The first ASIG-MA function is the monitoring function 480 which can be used for monitoring signaling or control messages and signaling or control message flows. It monitors the types of signaling or control messages, the sequence and the timing of such signaling or control messages as well as the state of various timers and operations associated with the logic managed by an analysis function 490. Monitoring function 480 information is typically passed to the analysis function 490 in this example embodiment.

In one aspect, the analysis function 490 is responsible for logging certain signaling or control messages, the signaling or control messages flows, any signaling or control network generated responses associated with the NSEs and other information that can be Obtained from the monitoring function 480. The analysis function 490 is also responsible for performing certain analyses and identifying proper responses or NSE operations that may be deemed necessary or desirable. The desired responses are then passed back up to the NSE generation function 430 for execution.

Table 4 presents exemplary logic rules in accordance with one or more aspects of the disclosure. One or more of such rules can be applied to signaling information and/or signaling or control messages monitored by the and an ASIG server of the one or more ASIG servers 114 via, for example, the analysis function 490 of the ASIG-MA subsystem 470. Other logic statements and/or rules can be defined and/or utilized.

As illustrated, Table 4 conveys an exemplary set of Intra-NSE logic rules and an exemplary set of Inter-NSE logic rules. In one aspect, intra-NSE rules can apply to signaling or control messages, responses, replies or other events that can occur within a single network signaling event. In another aspect, intra-NSE rules may not be associated (e.g., correlated, tied, or the like) to a signaling event of other NSE(s) and can be independent of state of the other NSE(s). With respect to inter-NSE rules, in one aspect, such rules can apply to signaling or control messages, responses, replies or other events that can occur across one or more NSEs. In another aspect, inter-NSE can be associated with a signaling event of other NSE(s) and can be dependent on state of the other NSE(s).

TABLE 4

Exemplary NSE Logic Rules in accordance with one or more aspects of the disclosure.

| Rule Type | No. | Description |
|---|---|---|
| Intra-NSE | 1 | The "18X Ceiling" Rule. If the first 18X event is not followed by another 18X event within 3000 milliseconds, cancel NSE4 |
| Intra-NSE | 2 | The "183-180 Sequence" Rule. If a 183 event is followed by a 180 event, cancel NSE4. |
| Intra-NSE | 3 | The "Intra 18X Floor" Rule. If any two SIP 18X events arrive less than 50 milliseconds apart, cancel NSE 4. |

TABLE 4-continued

Exemplary NSE Logic Rules in accordance with one or more aspects of the disclosure.

| Rule Type | No. | Description |
|---|---|---|
| Intra-NSE | 4 | The "Intra 18X Ceiling" Rule. If the first SIP 18X event is not followed by another SIP 18X event within 1500 milliseconds, cancel NSE 4. |
| Intra-NSE | 5 | The "18X Floor" Rule. If the first 18X event arrives less than 1500 milliseconds after the C4 INVITE, cancel NSE 4. |
| Intra-NSE | 6 | The "Fast 183" Rule. If NSE4 receives a SIP 183 event less than 1000 milliseconds after the NSE4 INVITE, cancel NSE4. |
| Intra-NSE | 7 | The "Canary" Rule. If NSE1 receives a SIP 487 event more than 106 milliseconds after the NSE1 BYE, cancel NSE3 and NSE4. |
| Inter-NSE | 1 | The "486" Rule. For any Iteration, in any section, if a SIP 486 is returned from the network, then all NSEs should be cancelled immediately. |
| Inter-NSE | 2 | The "Blast Thru - No Response" Rule. If all Network Signaling Events receive no response from the network other than a SIP 487 (which is in response to asig canceling the event) the result is deemed a "Blast Thru" in which all NSE timing expired with no response from the network. |
| Inter-NSE | 3 | The "Blast Thru with C4 Response" Rule, If NSE1, NSE2 and NSE3 signaling receive no network response other than a SIP 487, and if NSE4 receives a SIP 18X but NSE4 does not receive a SIP 200 within 1700 msec after the SIP 18X, then all NSEs should be cancelled immediately |
| Inter-NSE | 4 | The "183" Rule. If any two (2) signaling events in NSE1, NSE2, NSE3 or NSE4 return a SIP 183, and if NSE4 does not receive a SIP 200 within 2600 milliseconds after it receives its 183, then all NSEs should he cancelled immediately. |
| ASIG-MA | 1 | If no 18X is received on any NSE, continue to iteration 2, else continue to iteration 3, and so forth. |

Figure 5:
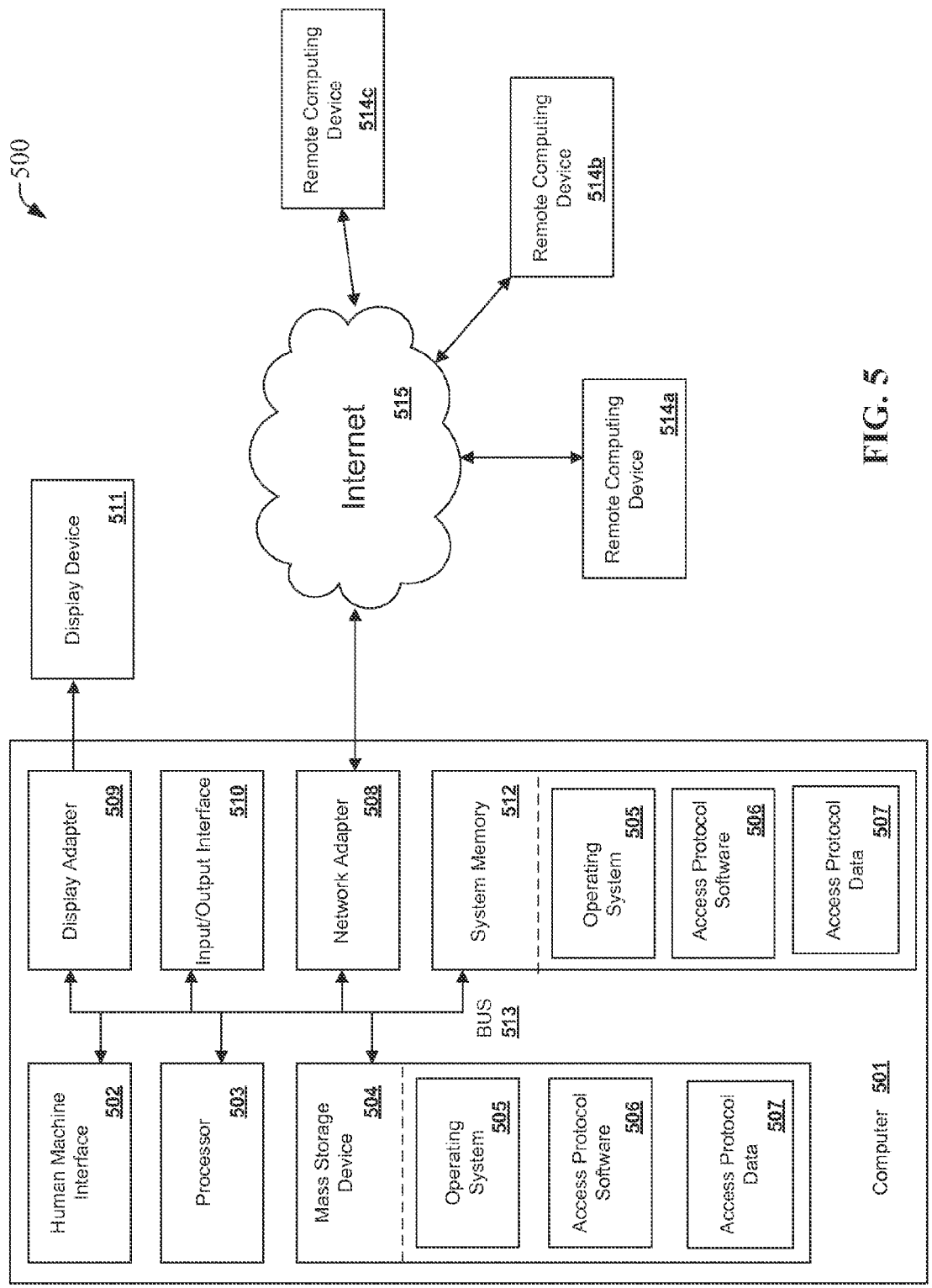
FIG. 5 illustrates a computing environment that enables various aspects of accessing, using, or controlling attached functions, features, services and network infrastructure in accordance with one or more aspects of the disclosure.

FIG. 5 illustrates a block diagram of an exemplary operating environment 500 that enables various features of the subject disclosure and performance of the various methods disclosed herein. In one aspect, computer 501 can embody a network element or a function or both. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The various embodiments of the subject disclosure can be operational with numerous other general purpose or special purpose computing system environments or configurations. Examples of well-known computing systems, environments, and/or configurations that can be suitable for use with the systems and methods comprise, but are not limited to, personal computers, server computers, laptop devices or handheld devices, and multiprocessor systems. Additional examples comprise wearable devices, mobile devices, set top boxes, programmable consumer electronics, network PCs, minicomputers, mainframe computers, distributed computing environments that comprise any of the above systems or devices, and the like.

The processing effected in the disclosed systems and methods can be performed by software components executed by a computing device via a processor therein or attached thereto. The disclosed systems and methods can be described in the general context of computer-executable instructions, such as program modules, being executed by one or more computers or other computing devices. Generally, program modules comprise computer code, routines, programs, objects, components, data structures, etc. that perform particular tasks or implement particular abstract data types. The disclosed methods also can be practiced in grid-based and distributed computing environments where tasks are performed by remote processing devices that are linked through a communications network. In a distributed computing environment, program modules can be located in both local and remote computer storage media including memory storage devices.

Further, it can be appreciated that the systems and methods disclosed herein can be implemented via a general-purpose computing device in the form of a computer 501. The components of the computer 501 can comprise, but are not limited to, one or more processors 503, or processing units 503 (a central processing unit, a graphics processing unit, etc.), a system memory 512, and a system bus 513 that couples various system components including the processor 503 to the system memory 512. In the case of multiple processing units 503, the system can utilize parallel computing.

In general, a processor 503 or a processing unit 503 refers to any computing processing unit or processing device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally or alternatively, a processor 503 or processing unit 503 can refer to an integrated circuit, an application specific integrated circuit (ASIG), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors or processing units referred to herein can exploit nano-scale architectures such as, molecular and quantum-dot based transistors, switches and gates, in order to optimize space usage or enhance performance of the computing devices that can implement the various aspects of the subject disclosure. Processor 503 or processing unit 503 also can be implemented as a combination of computing processing units.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and buses specified in this description also can be implemented over a wired or wireless network connection and each of the subsystems, including the processor 503, a mass storage device 504, an operating system 505, access protocol software 506, access protocol data 507, a network adapter 508, system memory 512, an Input/Output Interface 510, a display adapter 509, a display device 511, and a human machine interface 502, can be contained within one or more remote computing devices 514a,b,c at physically separate locations, connected through buses of this form, in effect implementing a fully distributed system. In one aspect, access protocol software code 506 can comprise an adaptive signaling system (ASIG) and related sub-systems (see, e.g., FIG. 1 or FIG. 2); such ASIG and related sub-systems can be embodied in code instructions and executed by processing unit 503.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data (such as a group of tokens employed for code buffers) and/or program modules such as operating system 505 and access protocol software 506 that are immediately accessible to and/or are presently operated on by the processing unit 503. Operating system 505 can comprise OSs such as Windows operating system, Unix, Linux, Symbian, Android, iOS, Chromium, and substantially any operating system for wireless computing devices or tethered computing devices.

In another aspect, the computer 501 also can comprise other removable/non-removable, volatile/non-volatile computer storage media. By way of example, FIG. 5 illustrates a mass storage device 504 which can provide non-volatile storage of computer code, computer readable instructions, data structures, program modules, and other data for the computer 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505, and access protocol software 506. Each of the operating system 505 and access protocol software 506 (or some combination thereof) can comprise elements of the programming and the access protocol software 506. Data and code (e.g., computer-executable instruction(s)) can be retained as part of access protocol software 506 and can be stored on the mass storage device 504. Access protocol software 506, and related data and code, can be stored in any of one or more databases know in the art. Examples of such databases comprise, DB2®, Microsoft® Access, Microsoft® n SQL Server, Oracle®, mySQL, PostgreSQL, and the like. Further examples include membase databases and flat file databases. The databases can be centralized or distributed across multiple systems.

In another aspect, the user can enter commands and information into the computer 501 via an input device (not shown). Examples of such input devices comprise, but are not limited to, a camera; a keyboard; a pointing device (e.g., a "mouse"); a microphone; a joystick; a scanner (e.g., barcode scanner); a reader device such as a radiofrequency identification (REID) readers or magnetic stripe readers; gesture-based input devices such as tactile input devices (e.g., touch screens, gloves and other body coverings or wearable devices), speech recognition devices, or natural interfaces; and the like. These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 also can be connected to the system bus 513 via an interface, such as a display adapter 509. It is contemplated that the computer 501 can have more than one display adapter 509 and the computer 501 can have more than one display device 511. For example, a display device can be a monitor, an LCD (Liquid Crystal Display), or a projector. In addition to the display device 511, other output peripheral devices can comprise components such as speakers (not shown) and a printer (not shown) which can be connected to the computer 501 via Input/Output Interface 510. Any step and/or result of the methods can be output in any form to an output device. Such output can be any form of visual representation, including, hut not limited to, textual, graphical, animation, audio, tactile, and the like.

The computer 501 can operate in a networked environment using logical connections to one or more remote computing devices 514a,b,c. By way of example, a remote computing device can be a personal computer, portable computer, a mobile telephone, a server, a router, a network computer, a peer device or other common network node, and so on. Logical connections between the computer 501 and a remote computing device 514a,b,c can be made via a local area network (LAN) and a general wide area network (WAN). Such network connections can be through a network adapter 508. A network adapter 508 can be implemented in both wired and wireless environments. Such networking environments are conventional and commonplace in offices, enterprise-wide computer networks, intranets, and the Internet 515. Networking environments generally can be embodied in wireline networks or wireless networks (e.g., cellular networks, such as Third Generation (3G) and Fourth Generation (4G) cellular networks, facility-based networks (femtocell, picocell, Wi-Fi networks, etc.).

As an illustration, application programs and other executable program components such as the operating system 505 are illustrated herein as discrete blocks, although it is recognized that such programs and components reside at various times in different storage components of the computing device 501, and are executed by the data processor(s) of the computer. An implementation of access protocol software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer-readable media can comprise "computer storage media," or "computer-readable storage media," and "communications media," "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

In certain implementations, the computer 501 can embody an ASIG of the one or more ASIG servers 114. In such implementations, in one aspect, the access protocol software 506 can comprise computer-accessible, e.g., computer-readable or computer-executable instructions, that embody the exemplary adaptive signaling system 410 and associated subsystems and functions in accordance with one or more aspects described herein. Accordingly, in one aspect, such computer-accessible instructions can configure the processor 503 to perform the functionality of the exemplary adaptive signaling system 410 and associated subsystems and functions in response to execution (e.g., by processor 503) of at least a portion of such instructions. Accordingly, in one of such implementations, the computer 501 can embody or comprise an apparatus comprising a memory (e.g., system memory 512) having computer-executable instructions encoded thereon; and a processor functionally coupled to the memory. The processor can be configured, by the computer-executable instructions, to evaluate signaling performance of a network element functionally coupled to one of a service network that provides, at least in part, an end-user network functionality or a signaling network functionally coupled to the network; to transmit a first pattern of one or more network signaling events (NSEs) associated with the end-user network functionality; to monitor signaling associated with at least one of the end-user network functionality or the first pattern of network signaling events; and in response to an adaptation logic rule being triggered, to modify the first pattern of network signaling events, to transmit the modified first pattern of network signaling events, and to monitor signaling associated with the end-user network functionality and the modified first pattern of network signaling events.

In one aspect, the processor can be further configured to determine whether a connection logic rule is triggered in response to the adaptation logic rule not being triggered. In another aspect, the processor can be further configured to connect to a network element that provides, at least in part, the end-user functionality.

In one aspect, to monitor the signaling associated with at least one of the end-user network functionality or the first pattern of one or more NSEs, the processor can be further configured to collect information associated with timing metrics associated with one or more signaling packets associated with at least one NSE of the first pattern of one or more NSEs. In another aspect, the processor can be further configured to analyze the information associated with the timing metrics associated with the one or more signaling packets. In yet another aspect, to monitor the signaling associated with at least one of the end-user network functionality or the modified first pattern of one or more NSEs, the processor can be further configured to collect information associated with timing metrics associated with one or more signaling packets associated with at least one NSE of the modified first pattern of NSEs.

In one aspect, in the foregoing apparatus, the processor can be further configured to analyze the information associated with the timing metrics associated with the one or more signaling packets. In another aspect, to modify the first pattern of one or more NSEs, the processor can be further configured to perform one or more of initiation of at least one NSE of the addition to one or more NSEs in the first pattern of NSEs, removal of at least one NSE of the first pattern of NSEs, modification of a type of at least one NSE of the first pattern of NSEs, modification of content of at least one NSE of the first pattern of NSEs, or modification of a timing sequence of the first pattern of NSEs.

In another aspect, to transmit the first pattern of one or more NSEs, the processor can be further configured to transmit each NSE of the first pattern of NSEs according to a timing sequence configured to cause one of a network or an attached function thereof to operate in a specific state, the network providing the end-user network functionality. In yet another aspect, to transmit the modified first pattern of NSEs, the processor can be configured to transmit each NSE of the modified first pattern of NSEs according to a modified timing sequence based at least in part on the adaptation logic rule, and wherein the adaptation logic rule is one of an intra-NSE logic rule or an inter-NSE logic rule. In still another aspect, to transmit each NSE of the modified first pattern of NSEs according to the modified sequence, the processor can be further configured to control timing of initiation of at least one NSE of the modified first pattern of one or more NSEs, the timing of the at least one NSE being suitable to cause a network element or an attached function of a network to operate in a specific state.

In another aspect, to transmit each NSE of the modified first pattern of one or more NSEs according to the modified sequence, the processor can be further configured to control duration of at least one NSE of the modified first pattern of NSEs, the duration of the at least one NSE being suitable to cause a network element or an attached function of a network to operate in a specific state. In yet another aspect, the processor can be further configured to utilize non-signaling information associated with the end-user network functionality. In still another aspect, to utilize the non-signaling information, the processor can be further configured to analyze the non-signaling information. In yet another aspect, the processor can be further configured to transmit a second pattern of one or more NSEs associated with the end-user network functionality in response to the connection logic rule not being triggered.

In view of the aspects described herein, several exemplary methods that can be implemented in accordance with the disclosed subject matter can be better appreciated with reference to the flowcharts in FIG. 6 through FIG. 9B. For purposes of simplicity of explanation, the exemplary method disclosed herein is presented and described as a series of acts; however, it is to be understood and appreciated that the claimed subject matter is not limited by the order of acts, as some acts may occur in different orders and/or concurrently with other acts from that shown and described herein. For example, the various methods or processes of the subject disclosure can alternatively be represented as a series of interrelated states or events, such as in a state diagram. Moreover, when disparate functional elements implement disparate portions of the methods or processes in the subject disclosure, an interaction diagram or a state flow can represent such methods or processes. Furthermore, not all illustrated acts may be required to implement a method in accordance with the subject disclosure. Further yet, two or more of the disclosed methods or processes can be implemented in combination with each other, to accomplish one or more features or advantages herein described. It should be further appreciated that the exemplary methods disclosed throughout the subject specification can be stored on an article of manufacture, or computer-readable medium, to enable transporting and transferring such methods to computers for execution, and thus implementation, by a processor or for storage in a memory.

Figure 6:
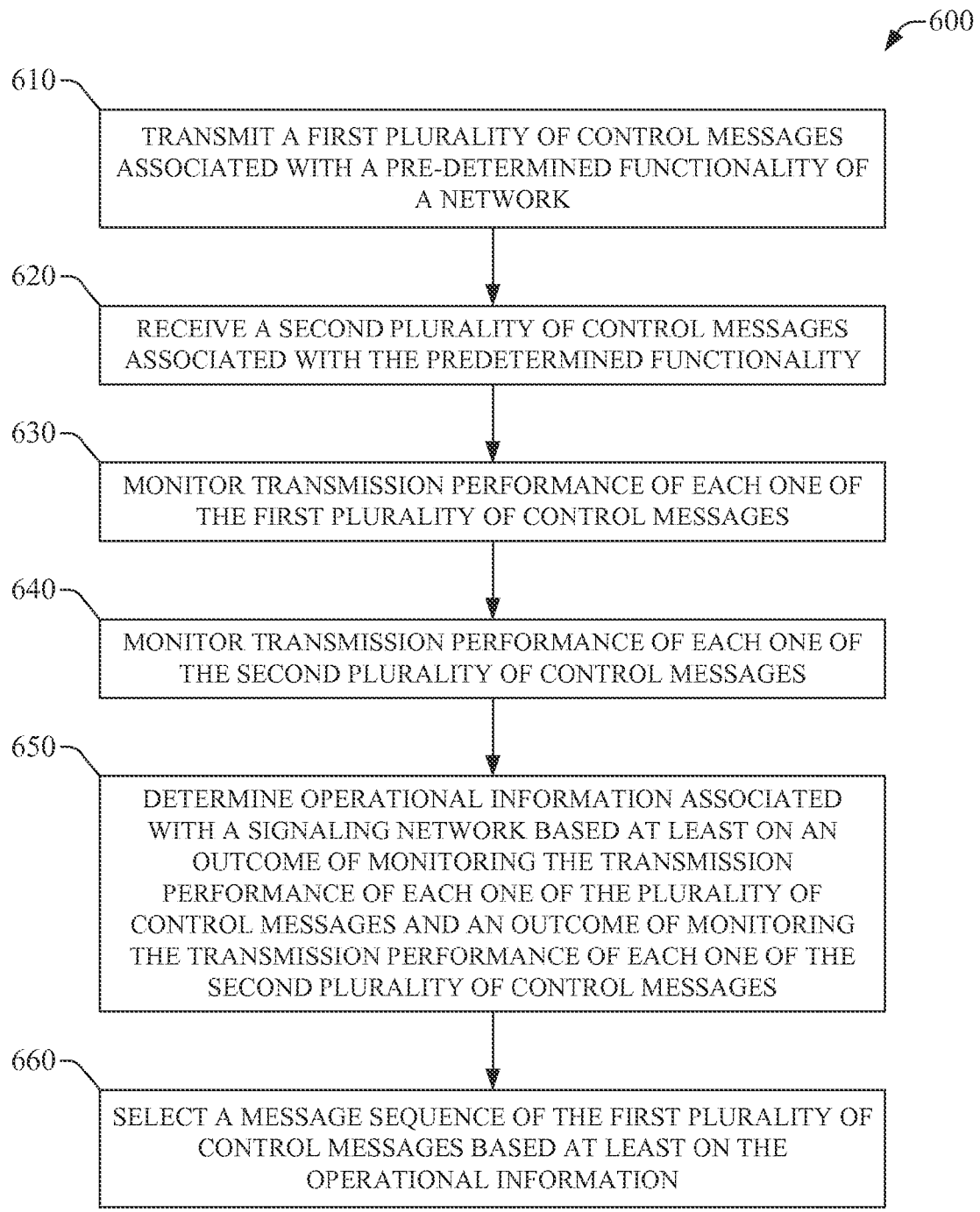
FIGS. 6-8 illustrate exemplary method in accordance with one or more aspects of the subject disclosure.

FIG. 6 is a flowchart of an exemplary method 600 for generating sequences of NSEs in accordance with one or more aspects of the subject disclosure. In one aspect, one of the generated sequences can be utilized for measuring performance of a signaling network (e.g., signaling network 140). In another aspect, another one of the generated sequences can be utilized for accessing, at least in part, a specific end-user functionality of a network, such as service network 130, functionally coupled to the signaling network.

At block 610, a first plurality of control messages associated with a pre-determined functionality of a network is transmitted. At block 620, a second plurality of control messages associated with the predetermined functionality is received. In one aspect, each one of the second plurality of control messages can be responsive to a control message of the first plurality of control messages. At block 630, transmission performance of each one of the first plurality of control messages is monitored. Block 630 can be referred to as a monitoring action and, in one aspect, can comprise monitoring processing duration of each one of the first plurality of control messages. As described herein, each of such control messages are specific to a signaling protocol (e.g., SIP, RTP, TCP/IP, or the like) and can produce a specific response, such as a specific control message, from the network (e.g., service network 130). Accordingly, processing duration can be determined, at least in part, by a time interval between transmission of a control message and an associated response (e.g., a response control message). In one scenario, monitoring the processing duration can comprise monitoring the duration of each one of the first plurality of control messages and identifying one or more of a minimum processing duration or a maximum processing duration. In one aspect, monitoring the transmission performance of each one of the first plurality of control messages comprises monitoring time offset between a first control message of the first plurality of control messages and a second control message of the first plurality of control messages. In certain implementations, monitoring the time offset between a first control message of the first plurality of control messages and a second control message of the first plurality of control messages comprises identifying one or more of a minimum time offset or a maximum time offset.

In certain embodiments, information other than the foregoing timing information can be acquired as part of the monitoring action. In one aspect, monitoring the transmission performance of each one of the first plurality of control messages can comprise collecting information associated with type of each one of the first plurality of control messages. In addition or in the alternative, monitoring the transmission performance of each one of the first plurality of control messages can comprise collecting information associated with type of a message sequence of at least a portion of the first plurality of control messages.

At block 640, transmission performance of each one of the second plurality of control messages is monitored. In one aspect, monitoring such transmission performance can comprise monitoring processing duration of each one of the second plurality of control messages. In certain implementations, monitoring the duration of each one of the second plurality of control messages can comprise identifying one or more of a minimum processing duration or a maximum processing duration. In another aspect, monitoring the transmission performance of each one of the second plurality of control messages can comprise monitoring time offset between a first control message of the second plurality of control messages and a second control message of the second plurality of control messages. In yet another aspect, monitoring the time offset between a first control message of the second plurality of control messages and a second control message of the second plurality of control messages can comprise identifying one or more of a minimum time offset or a maximum time offset.

Similarly to monitoring performance of one or more of the first plurality of control messages, information in addition to timing information can be collected as part of monitoring performance of one or more of the second plurality of control messages. Accordingly, in one aspect, monitoring transmission performance of each one of the second plurality of control messages can comprise collecting information associated with type of each one of the second plurality of control messages and/or type of a message sequence of at least a portion of the second plurality of control messages.

At block 650, operational information (or operational characteristics) associated with a signaling network is determined based at least on an outcome of monitoring the transmission performance of each one of the plurality of control messages and at least an outcome of monitoring the transmission performance of each one of the second plurality of control messages. In one aspect, the signaling network is coupled to the network and can provide signaling functionality associated with the predetermined functionality (e.g., voicemail functionality) of the network.

At block 660, a message sequence of the first plurality of control messages is selected based at least on the operational information. In one implementation, the message sequence can be suitable to measure performance of the signaling network. For example, such message sequence can have a single pattern of NSEs, as illustrated in Table 1. In another implementation, the message sequence can be suitable to access a predetermined end-user functionality of the network. For another example, the message sequence can have at least two patterns of NSEs, as illustrated in Tables 2-3.

Figure 7:
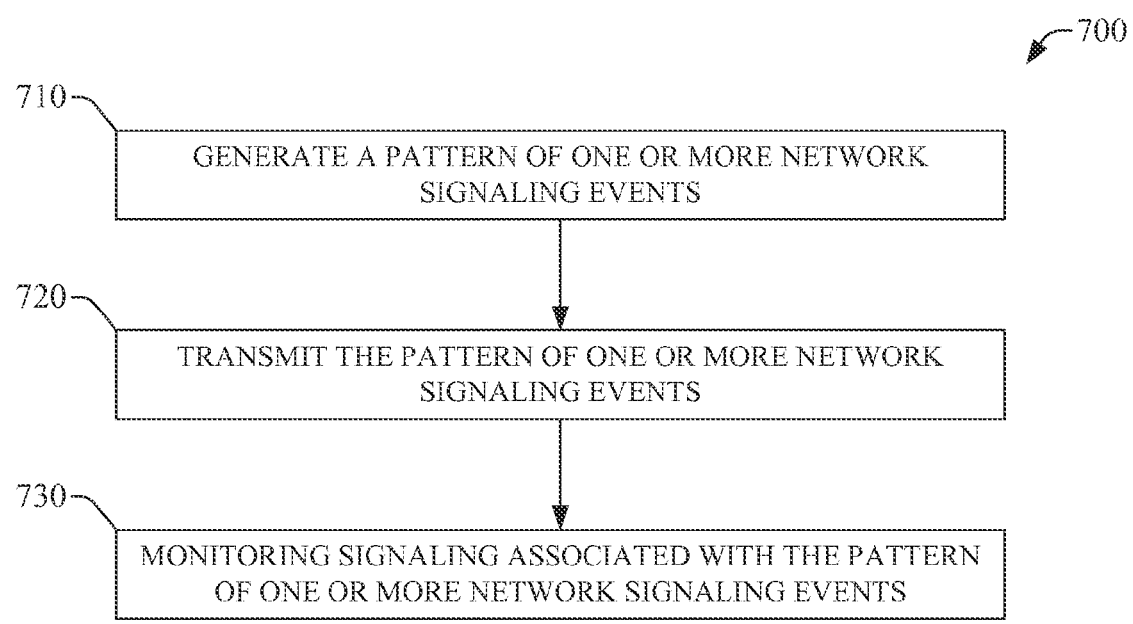

FIG. 7 is a flowchart of exemplary method 700 for measuring signaling performance of a network element in accordance with one or more aspects of the disclosure. In one embodiment, a computing device such as an ASIG server of the one or more ASIG servers 114 can implement (e.g., execute) the exemplary method 700 or one or more blocks (also referred to as actions or steps) thereof in accordance with one or more aspects described herein. In another embodiment, a computing device comprising the exemplary system 400 can implement (e.g., execute) the exemplary method 700 or more blocks thereof in accordance with one or more aspects described herein. It should be appreciated that a processor contained in the computing device or functionally coupled thereto also can implement (e.g., execute) the exemplary embodiment 700 or one or more blocks thereof. At block 710, a pattern of network signaling events is generated. In one aspect, the pattern can be specific to a signaling functionality of a network (e.g., service network 130 or signaling network 140) and can be suitable to assess performance, such as signaling performance, of a network element (e.g., a router, a switch, a special purpose server such as a session border controller, a border gateway controller, or the like) functionally coupled to the network. As described herein, in one aspect, each one of the network signaling events can comprise communication of one or more control messages (see, e.g., FIG. 2A) at one or more specific times. In addition, each one of the network signaling events can span a specific time interval or duration, e.g., Δt (as illustrated in FIG. 2A). At block 720, the pattern of network signaling events is transmitted.

At block 730, signaling associated with the pattern of network signaling events is monitored. Block 730 can be referred to as a monitoring act (or step) and, in one aspect, can comprise monitoring one or more of processing duration of a signaling packet indicative of a query, or network transit time of the signaling packet. In another aspect, the monitoring at block 730 can comprise monitoring a time offset between communication of a first signaling packet and communication of a second signaling packet, the second signaling packet being associated with the first signaling packet.

In an additional or alternative aspect, the monitoring at block 730 can comprise monitoring one or more of a minimum time offset between a third signaling packet and a fourth signaling packet, or a maximum time offset between the third signaling packet and the fourth signaling packet. In another aspect, the monitoring can comprise monitoring one or more of a minimum time for communication of a fifth signaling packet and sixth signaling packet, or maximum timing between the first signaling packet and the second signaling packet, the fifth signaling packet associated with the sixth signaling packet.

In another aspect, the monitoring act, or step, can comprise collecting information associated with types of signaling packets in the second pattern of network signaling events. In yet another aspect, the monitoring at block 730 can comprise collecting information associated with a sequence of control messages in the second pattern of network signaling events, the information being indicative, at least in part, of presence or absence of a specific type of signaling message in the sequence.

In certain embodiments, the exemplary method 700 also can comprise generating timing information for at least one pattern of a sequence of first patterns of one or more network signaling events. In other embodiments, the exemplary method 700 also can comprise collecting information associated with historical performance of the signaling network for the signaling functionality.

As described herein, monitoring signaling can comprise monitoring one or more signaling or control timing metrics or performance metrics, such as the request processing duration; the network transit time of; the elapsed time between; the minimum elapsed time of; the minimum elapsed time between; the maximum elapsed time of; and the maximum elapsed time between NSEs, NSE patterns, signaling or control messages, and any associated NSE or signaling or control message replies and responses. In addition or in the alternative, such metrics can comprise monitoring request processing duration of signaling or control messages, replies and other responses; the network transit time of signaling or control messages, replies and other responses; the timing between signaling or control messages, replies and other responses; the minimum timing of signaling or control messages, replies and other responses; the minimum timing between signaling or control messages, replies and other responses; the maximum timing of signaling or control messages, replies and other responses; and/or the maximum timing between signaling or control messages, replies and other responses.

Figure 8:
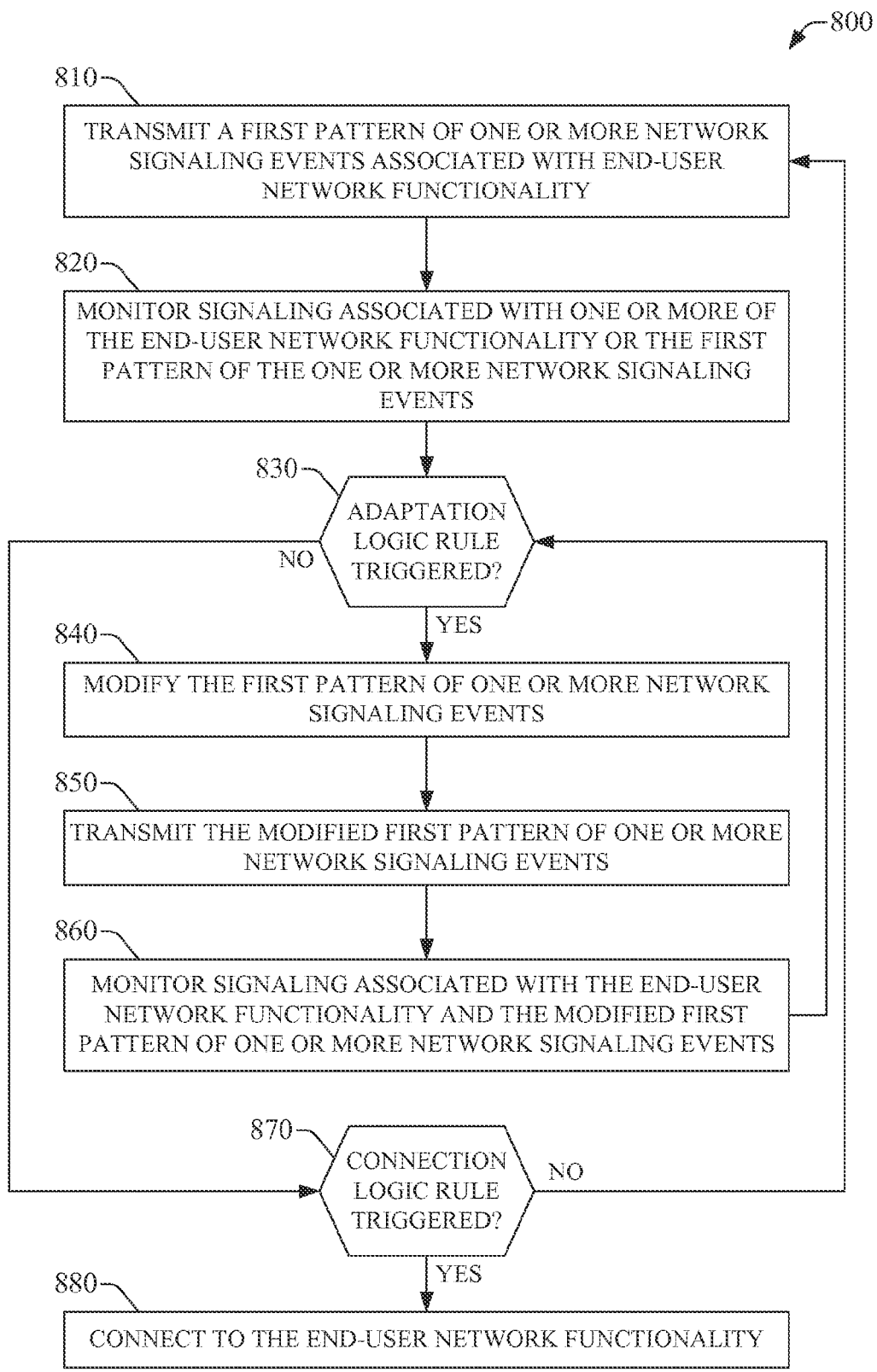

FIG. 8 is a flowchart of exemplary method 800 for accessing a specific functionality, such as end-user functionality, of a network in accordance with one or more aspects of the disclosure. In one embodiment, a computing platform or one or more components therein or functionally coupled thereto can implement the exemplary method 800. In another embodiment, a computing device such as an ASIG server of the one or more ASIG servers 114 can implement (e.g., execute) the exemplary method 800 or one or more blocks (also referred to as actions or steps) thereof in accordance with one or more aspects described herein. In another embodiment, a computing device comprising the exemplary system 400 can implement (e.g., execute) the exemplary method 800 or more blocks thereof in accordance with one or more aspects described herein. It should be appreciated that a processor contained in the computing device or functionally coupled thereto also can implement (e.g., execute) the exemplary embodiment 800 or one or more blocks thereof. At block 810, a first pattern of one or more network signaling events associated with an end-user network functionality is transmitted. In one aspect, the end-user network functionality can be a service provided by a network or an attached function functionally coupled to the network, the service and/or the attached function can be consumed or utilized by an end-user or an end-user device. In one aspect, transmitting the first pattern of one or more NSEs can comprise transmitting each NSE of the first pattern of one or more NSEs according to a timing sequence configured to cause one of a network element or an attached function thereof to operate in a specific state, wherein the network can provide the end-user network functionality.

At block 820, signaling associated with one or more (or at least one) of the end-user network functionality or the first pattern of one or more network signaling events is monitored. Block 820 can be referred to as a monitoring action. In one aspect, the signaling can comprise control messages, such as requests and associated responses. In another aspect, monitoring the signaling associated with at least one of the end-user network functionality or the first pattern of NSEs comprises collecting information associated with timing metrics associated with one or more signaling packets associated with at least one NSE of the first pattern of NSEs. In certain implementations, the monitoring block 820 can comprise analyzing the information associated with the timing metrics associated with the one or more signaling packets. In yet another aspect, monitoring signaling associated with one or more of the end-user network functionality or the first pattern of NSEs further comprises analyzing the information associated with the timing metrics associated with the one or more signaling packets.

At block 830, it is determined if an adaptation logic rule (e.g., an intra-NSE rule or an inter-NSE rule) is triggered. Triggering of the adaptation rule can occur in response to applying the adaptation rule to information e.g., signaling timing information, signaling type information, historical performance information, network status, data associated with the network, and the like collected at least in part through the monitoring action (or step). In a scenario in which the adaptation logic rule is triggered, flow is directed to act 840 in which the first pattern of one or more network signaling events is modified. Modifying the first pattern can comprise adjusting timing of transmission of NSEs in the first pattern and/or removal of one or more NSEs in such pattern. In one aspect, modifying the first pattern of one or more NSEs can comprise one or more of initiating at least one NSE in addition to one or more NSEs in the first pattern of NSEs; purging at least one NSF of the first pattern of NSEs; modifying a type of at least one NSE of the first pattern of NSEs; modifying the content of at least one NSE of the first pattern of NSEs or modifying a timing sequence of the first pattern of NSEs. It should be appreciated that in scenarios in which signaling is communicated according to SIP, parameters of a call session can be renegotiated by communication of suitable SIP requests (e.g., SIP INVITE messages).

In addition or in the alternative, at block 850, the modified first pattern of one or more network signaling events is transmitted. In one aspect, transmitting the modified first pattern of one or more NSEs can comprise transmitting each NSE of the modified first pattern of one or more NSEs according to a modified timing sequence based at least in part on the adaptation logic rule (see, e.g., Table 4), and wherein the adaptation logic rule can be one of an intra-NSE logic rule or an inter-NSE logic rule. In another aspect, transmitting each NSE of the modified first pattern of one or more NSEs according to the modified sequence can comprise controlling timing of initiation of at least one NSE of the modified first pattern of NSEs, the timing of the at least one NSE being suitable to cause a network element or an attached function to operate in a specific state. In certain implementations, transmitting each NSE of the modified first pattern of one or more NSEs according to the modified sequence can comprise controlling duration of at least one NSE of the modified first pattern of one or more NSEs, wherein the duration of the at least one NSE can be suitable to cause a network element or an attached function of a network to operate in a specific state. Table 2 illustrates one or more durations of respective NSE that can be suitable to cause the network or the attached function of the network to operate in a particular state.

Moreover or as another alternative, a block 860, signaling associated with one or more of the end-user network functionality or the modified first pattern of one or more network signaling events can be monitored. Upon or after implementation of block 860, flow can be directed to block 830. In one aspect, monitoring the signaling associated with one or more of the end-user network functionality or the modified first pattern of one or more NSEs can comprise collecting information associated with timing metrics associated with one or more signaling packets associated with at least one NSE of the modified first pattern of one or more NSEs.

In certain implementations of blocks 820 and 860, the respective monitoring actions can comprise generating records and/or analyzing signaling information, such as the signaling or control messages themselves, NSEs, NSE patterns, signaling or control message responses or replies, message type information and corresponding information such as timestamps, expiry and other timers and logic rules.

In the alternative, when the adaptation rule is not triggered, flow is directed to block 870 in which it is determined if a connection logic rule (e.g., ASIG-MA logic rule presented in Table 4) is triggered. In one aspect, the connection logic rule can be applied to signaling information collected as part of the monitoring act 820. In the affirmative case, flow is directed to block 860 in which the computing platform that implements the exemplary method 800 can connect to the end-user network functionality at block 880. In one aspect, connecting to the end-user functionality can comprise connecting to a network element that provides, at least in part, the end-user functionality. Yet, in the negative case, flow is directed to block 810 to reiterate the exemplary method 800. It should be appreciated that in response to the connection logic rule not being triggered, another pattern of signaling events (e.g., Iteration 2 in the PPX model at Table 2) can be transmitted. For example, a second pattern of one or more NSEs associated with the end-user network functionality can be transmitted in response to the connection logic rule not being triggered.

In certain embodiments, the exemplary method 800 can comprising evaluating signaling performance of a network element prior to transmitting the first pattern of NSEs, wherein the network element can be functionally coupled to one of a service network. (e.g., service network 140) that provides, at least in part, the end-user network functionality or a signaling network (e.g., service network 130) functionally coupled to the network. In one implementation, measuring signaling performance can be accomplished by performing the exemplary method 700. In other embodiments, the exemplary method 800 can comprise utilizing one or more of non-signaling information associated with the end-user functionality, current or historical information associated with performance of a network that provide the end-user functionality, network status, data or descriptive information associated such network or a network element thereof or a signaling network coupled to the network (e.g., service network 130). In one aspect, utilizing the non-signaling information comprises analyzing the non-signaling information.

Figure 9A:
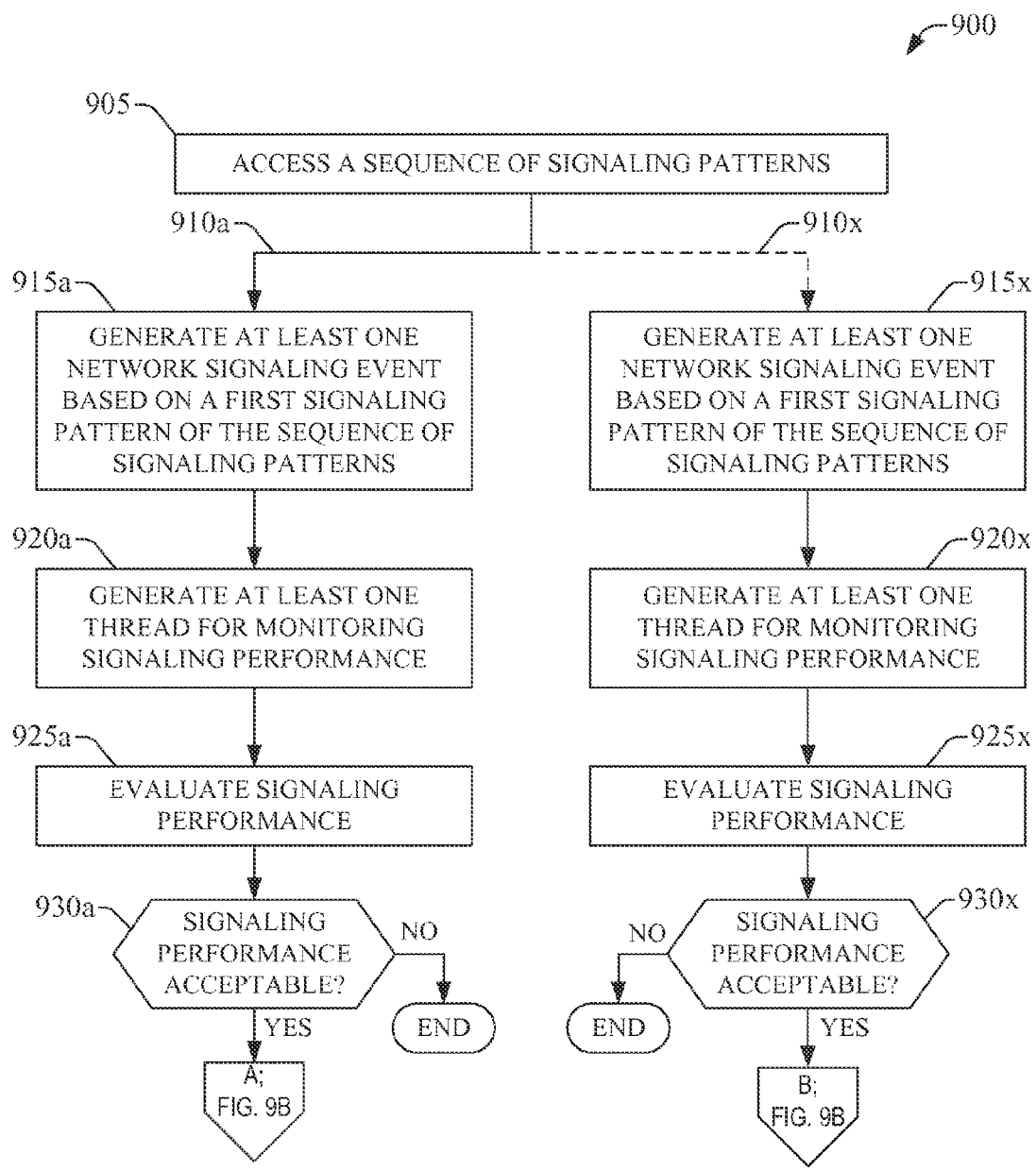
FIGS. 9A-9B illustrate an exemplary method for accessing, using, or controlling attached functions, features, services and network infrastructure in accordance with one or more aspects of the disclosure.
Figure 9B:
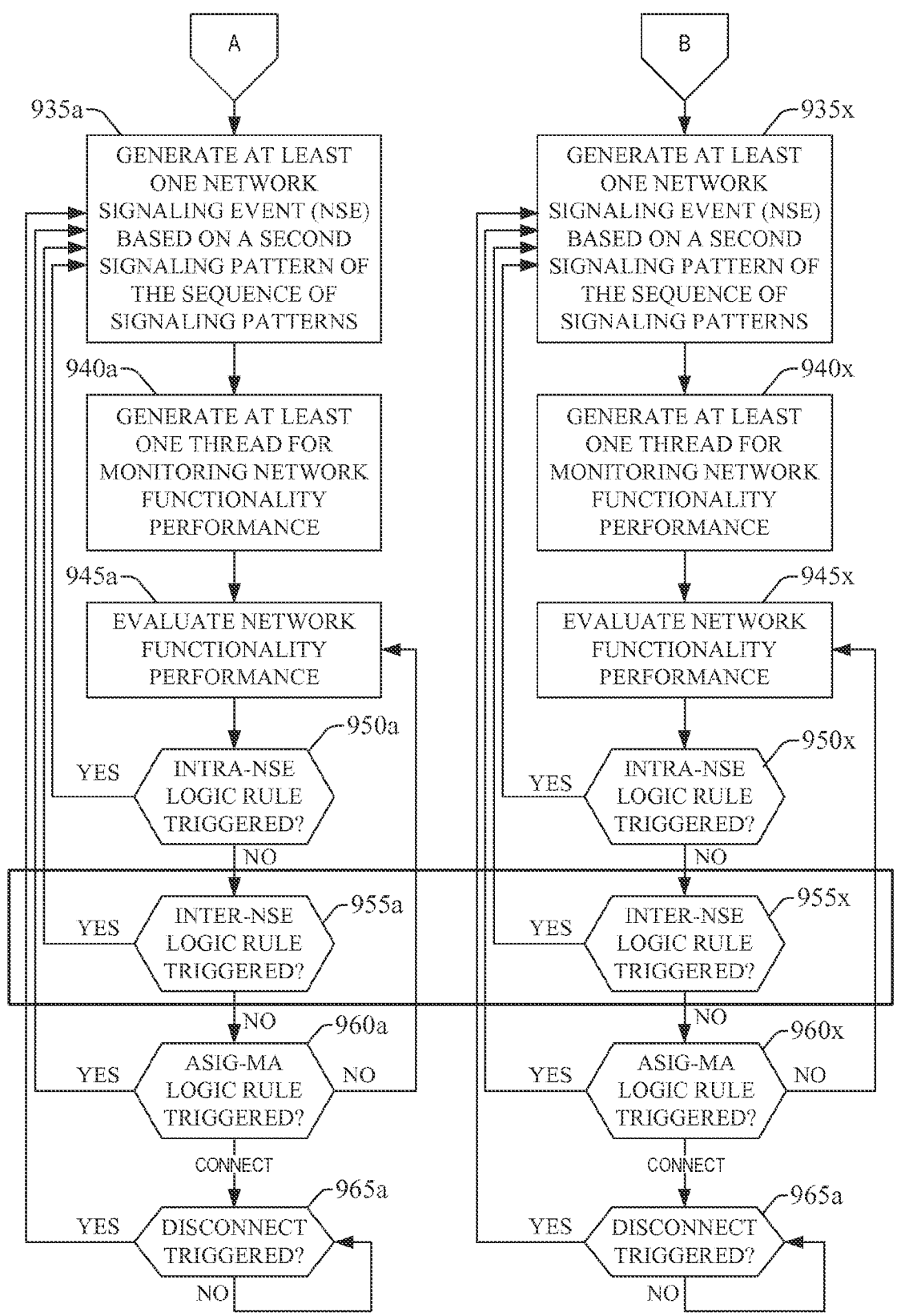

FIGS. 9A-9B illustrates an exemplary method 900 for accessing, using, or controlling attached functions, features, services, and/or network infrastructure in accordance with one or more aspects of the subject disclosure. At block 905, an NSE generation function (e.g., 430) can access a sequence of signaling patterns. In one aspect, reading the sequence of signaling patterns can comprise reading a configuration file. In one aspect, accessing the sequence of signaling patterns (e.g., the configuration file) can permit generation of a single NSE flow 910*a*. In one aspect, when the sequence of signaling patterns is accessed by reading a configuration file, the NSE generation function or a computing device functionally coupled thereto can process the configuration file and such processing can enable the NSE generation function or the computing device to generate a single NSE Flow 910*a*. In addition or in the alternative, the configuration file, when processed by the NSE generation function or the computing device functionally coupled thereto, can enable the NSE generation function to generate one or more NSE flows, depicted by numeral 910*x*. For the sake simplicity, and without intent to limit the disclosure, a single additional NSE Flow is described herein. The various aspects and features described in connection with NSE flow processing for the NSE flow 910*a* are applicable to any NSE flow of the disclosure, such as flow 910*x*.

At block 915*a*, in response to accessing the sequence of signaling events, e.g., reading the configuration file, the NSE generation function or the computing device functionally coupled thereto can generate at least one NSE based on a first signaling pattern of the sequence of signaling patterns, the at least one NSE can be utilized for measuring the current performance of a signaling or control network (e.g., signaling network 140) according to the one or more parameters (e.g., timing of NSE(s), timing between NSE(s), duration of NSE(s), or the like) contained in the configuration file. In certain embodiments, the at least one NSE can be transmitted to a control plane of a network (e.g., service network 130) functionally coupled (e.g., communicatively coupled) with the signaling or control network. In one embodiment, the first signaling pattern of NSEs containing the at least one NSE can be the performance measurement signaling signature shown in Table 1. At block 920*a*, at least one thread for monitoring signaling performance can be generated. In one embodiment, a signaling network performance function (e.g., function 460) or a computational device functionally coupled thereto can generate (e.g., configure and execute) the at least one thread. At block 925*a*, signaling performance can be evaluated. In one aspect, the at least one NSE can be monitored, logged, and/or analyzed by the signaling network performance function or the computational device functionally coupled thereto in order to ascertain the performance of the signaling or control network. In one exemplary scenario in which the at least one NSE includes a plurality of NSEs that contained in the first signaling pattern 915a (as illustrated in Table 1), in one aspect, the performance of the signaling or control network can include one or more of response processing time to NSE1 or the presence of signaling messages indicative of an overload condition (such as a SIP 486 message or a SIP 503 message) at a network element (e.g., element 2010b or one of the network element(s) 134) that can be utilized to access a destination network (e.g., service network 130). In such exemplary scenario, in another aspect, NSE4 can be utilized to determine a current performance characteristic of the signaling or control network for an attached function (e.g., one or more of the attached functions 2020a through 2020f) in the destination network. At block 930a, it is determined if the signaling performance or control network performance is unsatisfactory. In one embodiment, the signaling network performance function or the computing device functionally coupled thereto that can implement (e.g., execute) block 920a can perform the analysis associated with such determination. In one aspect, the exemplary method 900 can be halted in response to an outcome of block 930a being indicative of unacceptable or unsatisfactory performance. Other additional or alternative exception handling can be implemented in response to unsatisfactory performance. In another aspect, if the signaling or control network performance is deemed acceptable, additional NSE(s) can be generated at block 950a according to the parameters of the configuration file. As illustrated at block 950a, at least one NSE can be generated based on a second signaling pattern of the sequence of signaling patterns. The NSE generation function or the computational device functionally coupled thereto can generate the additional NSE(s), e.g., the at least one NSE based on the second signaling pattern. The additional NSE(s) can be transmitted to the control plane of the network functionally coupled to the signaling network or control network. In certain embodiments, the additional NSE(s) or the second signaling pattern can be Iteration 2 on one of the models shown in Table 2, or one or more of the signaling signatures (e.g., Iterations 2 or 3 in the 3XX0 model or Iterations 2, 3, or 4 of the 3PXX0 model) shown at Table 3. In such embodiments, as described herein, one or more actual measured performance characteristics derived from the monitoring and analysis of a performance measurement signaling signature see, e.g., Table 1) can be utilized to adapt the signaling signature illustrated at Table 2. In one implementation, a time interval derived from a previous performance measurement signaling signature related to the elapsed time of a response from the destination network or a network element to NSE4 can be extracted and added to the 18X TO value of the signaling signatures illustrated in Table 2 to adapt the signaling signature to a current performance of the signaling network or network element functionally coupled to the network.

At block 940a, at least one thread for monitoring network functionality performance can be generated. As described herein, in one embodiment, a signaling network performance function (e.g., function 460) can be utilized to monitor the at least network signaling event based on the first signaling pattern of the sequence of signaling patterns and/or any other active NSE(s). In the illustrated embodiment, at block 945a, network functionality performance can be evaluated at block 945a. In one scenario, at least one (e.g., one, two, three, . . . , all) active NSE can be monitored at block 945a. In one embodiment, a monitoring function of the ASIG-MA subsystem 470, as previously described in FIG. 4 can implement (e.g., execute) block 945a. As an example, a set of three decision points, represented by block 950a, block 955a, and block 960a, are illustrated in FIG. 9B, each decision point representing a primary category of logic rules applied, in one embodiment, by an analysis function 490 of the ASIG-MA subsystem 470. In one aspect, at block 950a, an Intra-NSE logic rule outlined in Table 4 can be applied to signaling information collected at block 945a, for example, and it can be determined whether such rule is triggered. In yet another aspect, at block 955a, an Inter-NSE logic rule outlined in Table 4 can be applied to signaling information collected at block 945a, for example, and it can be determined is such rule is triggered. In still another aspect, at block 960a, an ASIG-MA logic rule outlined in Table 4 can be applied to signaling information collected at block 945a, for example, and it can be determined whether such rule is triggered. In scenarios in which application of any of these rules results in one of such rules being triggered (e.g., a "Yes" pathway in FIG. 9B), in one embodiment, the analysis function 490 of the ASIG-MA subsystem 470 can determine an appropriate response and, at block 935a, the NSE generation function (e.g., function 430) can generate a required or intended NSE response, reply, or modification. In alternative scenarios in which none of the rules applied at blocks 950a, 955a, or 960a are triggered, the process flow of the subject exemplary method 900 continues until a connection to the attached function, feature, service, or network infrastructure can be achieved. After being achieved, such connection can maintained until an initiated session is ended by a disconnect signal or control message, as illustrated at block 965a.

In one aspect, as illustrated in FIG. 9B, an inter-NSE monitoring process can be implemented (depicted by dashed-line rectangle) in scenarios in which more than one NSE flows are generated in response to accessing the sequence of signaling patterns at 905. Such monitoring can be enabled, at least in part, by one or more monitoring threads generated at blocks 940a and 940x, wherein signaling information associated with two or more NSE flows can be collected from the one or more monitoring threads. In one implementation, such inter-NSE monitoring processes can comprise a set of one or more Inter-NSE logic rules, which can interact on multiple NSE flows as depicted by the dotted line box outlining the Inter-NSE Logic Rule Trigger decision points implemented at steps 955a through step 955x.

It should be appreciated that in the exemplary method 900, blocks 915x, 920x, 925x, 930x, 935x, 940x, 945x, 950x, 955x, 960x, and 955x can be implemented in substantially the same manner as respective blocks 915a, 920a, 925a, 930a, 935a, 940a, 945a, 950a, 955a, 960a, and 955a.

When compared to conventional solutions, various advantages emerge from the features or aspects described herein. For example, an ASIG server of the adaptive signaling platform 110, when implementing (e.g., executing) the exemplary system 400, a device that is accessed according to the signaling signatures described does not ring. Such a device can be a domestic telephone (mobile or otherwise) or a non-domestic telephone. In addition, the device can be a pre-paid telephone. For another example, the signaling signatures can be carrier (e.g., network operator) specific. Thus, the adaptive signaling platform 110, via the exemplary system 400, can operate, e.g., access a specific service, functionality, or attached function, for any carrier for which signaling signatures are available. For yet another example, the signaling signatures utilized to measure signaling performance of access a service or functionality of a network or an attached function thereof may not rely (or require) on inspection of signaling packets and content (e.g., payload) thereof. For still another example, the signaling signatures described herein do not rely on specific codes associated with the service or functionality that is intended to be accessed.

In various embodiments, the systems and methods of the subject disclosure regarding adaptive signaling for accessing, using, and controlling network attached functions, services, and features can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

While the systems, devices, apparatuses, protocols, processes, and methods have been described in connection with exemplary embodiments and specific illustrations, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where description of a process or method does not actually recite an order to be followed by its acts or steps or it is not otherwise specifically recited in the claims or descriptions of the subject disclosure that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent to those skilled in the art that various modifications and variations can be made in the subject disclosure without departing from the scope or spirit of the subject disclosure. Other embodiments of the subject disclosure will be apparent to those skilled in the art from consideration of the specification and practice of the subject disclosure as disclosed herein. It is intended that the specification and examples be considered as non-limiting illustrations only, with a true scope and spirit of the subject disclosure set forth herein.

What is claimed is:

1. A method, comprising:
   transmitting a first plurality of control messages associated with a pre-determined functionality of a network;
   receiving a second plurality of control messages associated with the predetermined functionality of the network;
   monitoring transmission performance of the first plurality of control messages and the second plurality of control messages;
   determining operational information associated with a signaling network based at least on an outcome of monitoring the transmission performance of the first plurality of control messages and the second plurality of control messages; and
   generating one or more network signaling events (NSEs) comprising at least one of the first plurality of control messages based at least on the operational information, wherein each of the one or more NSEs comprise a first control message and a second control message, wherein the first control message and the second control message are separated by a time span determined based on the operational information.

2. The method of claim 1, wherein receiving a second plurality of control messages associated with the predetermined functionality is responsive to transmitting a control message of the first plurality of control messages.

3. The method of claim 1, wherein monitoring transmission performance of the first plurality of control messages and the second plurality of control messages, comprises monitoring processing duration of each one of the first plurality of control messages and each one of the second plurality of control messages.

4. The method of claim 3, wherein monitoring the processing duration of each one of the first plurality of control messages and each one of the second plurality of control messages comprises:
   determining the processing duration of each one of the first plurality of control messages and each one of the second plurality of control messages; and
   identifying one or more of a minimum processing duration and a maximum processing duration.

5. The method of claim 1, wherein monitoring transmission performance of the first plurality of control messages, comprises:
   determining a time offset between a first control message and a second control message of the first plurality of control messages; and
   identifying one or more of a minimum time offset and a maximum time offset.

6. The method of claim 1, wherein monitoring transmission performance of the second plurality of control messages, comprises:
   determining a time offset between a first control message and a second control message of the second plurality of control messages; and
   identifying one or more of a minimum time offset and a maximum time offset.

7. The method of claim 1, wherein the signaling network is coupled to the network and the signaling network provides signaling functionality associated with the predetermined functionality of the network.

8. The method of claim 1, wherein the one or more NSEs are configured to measure performance of the signaling network.

9. The method of claim 1, wherein the one or more NSEs are configured to access a predetermined end-user functionality of the network.

10. The method of claim 1, wherein the first control message is a request message to a specific signaling protocol and the second control message is a terminate message that terminates the request message.

11. The method of claim 1, wherein the time span comprises a delay interval and a NSE duration interval.

12. A method, comprising:
   transmitting a first pattern of one or more network signaling events (NSEs), the first pattern being specific to a signaling functionality of a network and suitable to assess performance of a network element functionally coupled to the network, each of the one or more network signaling events comprising communication of a first control message at a first time and communication of a second control message at a second time,
   wherein the first control message is a request message to a specific signaling protocol and the second control message is a terminate message that terminates the request message, and
   wherein a specific delay between the first time and the second time of the communication of the first message and second message cause the network element or an attached function to operate in a specific state; and monitoring signaling associated with the first pattern of one or more NSEs and the signaling functionality of the network.

13. The method of claim 12, further comprising generating timing information for at least one pattern of a sequence of first patterns of one or more network signaling events.

14. The method of claim 12, further comprising collecting information associated with historical performance of the signaling network for the signaling functionality.

15. The method of claim 12, wherein monitoring signaling associated with the first pattern of one or more NSEs, comprises monitoring one or more of processing duration of a signaling packet indicative of a query, and network transit time of the signaling packet.

16. The method of claim 12, wherein monitoring signaling associated with the first pattern of one or more NSEs, comprises monitoring a time offset between communication of a first signaling packet and communication of a second signaling packet, the second signaling packet being associated with the first signaling packet.

17. The method of claim 16, wherein monitoring signaling associated with the first pattern of one or more NSEs, comprises monitoring one or more of a minimum time offset between a third signaling packet and a fourth signaling packet, and a maximum time offset between the third signaling packet and the fourth signaling packet.

18. The method of claim 17, wherein monitoring signaling associated with the first pattern of one or more NSEs, comprises monitoring one or more of a minimum time for communication of a fifth signaling packet and sixth signaling packet, and maximum timing between the first signaling packet and the second signaling packet, the fifth signaling packet associated with the sixth signaling packet.

19. The method of claim 12, wherein monitoring signaling associated with the first pattern of one or more NSEs, comprises collecting information associated with types of signaling packets in the first pattern of network signaling events.

20. The method of claim 12, wherein monitoring signaling associated with the first pattern of one or more NSEs, comprises collecting information associated with a sequence of control messages in the first pattern of network signaling events, the information being indicative, at least in part, of a presence or an absence of a specific type of signaling message in the sequence.

* * * * *